(12) United States Patent
Wang

(10) Patent No.: US 12,526,409 B2
(45) Date of Patent: Jan. 13, 2026

(54) INTER-FRAME PREDICTION METHOD, CODER, DECODER, AND STORAGE MEDIUM

(71) Applicant: GUANGDONG OPPO MOBILE TELECOMMUNICATIONS CORP., LTD., Dongguan (CN)

(72) Inventor: Fan Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 31 days.

(21) Appl. No.: 18/433,775

(22) Filed: Feb. 6, 2024

(65) Prior Publication Data
US 2024/0291982 A1    Aug. 29, 2024

Related U.S. Application Data

(63) Continuation of application No. PCT/CN2021/112852, filed on Aug. 16, 2021.

(51) Int. Cl.
  *H04N 19/119*  (2014.01)
  *H04N 19/105*  (2014.01)
  (Continued)

(52) U.S. Cl.
  CPC ......... *H04N 19/119* (2014.11); *H04N 19/105* (2014.11); *H04N 19/167* (2014.11); *H04N 19/176* (2014.11)

(58) Field of Classification Search
  None
  See application file for complete search history.

(56) References Cited

U.S. PATENT DOCUMENTS

| 9,571,830 B2 | 2/2017 | Song |
| 9,686,562 B2 | 6/2017 | Song |
| (Continued) | | |

FOREIGN PATENT DOCUMENTS

| CN | 106375765 A | 2/2017 |
| CN | 104126302 B | 8/2017 |
| (Continued) | | |

OTHER PUBLICATIONS

International Search Report in the international application No. PCT/CN2021/112852, mailed on May 12, 2022, 5 pages with English translation.
(Continued)

*Primary Examiner* — Christopher G Findley
(74) *Attorney, Agent, or Firm* — BAYES PLLC

(57) ABSTRACT

Provided are methods for inter prediction, and a decoder. The decoder decodes a bitstream to determine an inter prediction mode parameter for a current block; determines at least one first reference block and at least one second reference block for the current block when the inter prediction mode parameter indicates that an adaptive partitioning mode (APM) is used for the current block to determine an inter prediction value of the current block, the APM being used for partitioning of arbitrary shapes based on picture contents; and determines a prediction value of the current block according to the at least one first reference block and the at least one second reference block.

19 Claims, 8 Drawing Sheets

(51) Int. Cl.
    *H04N 19/167*     (2014.01)
    *H04N 19/176*     (2014.01)

(56) References Cited

U.S. PATENT DOCUMENTS

| | | |
|---|---|---|
| 9,900,610 B2 | 2/2018 | Song |
| 2011/0200111 A1* | 8/2011 | Chen .................... H04N 19/137 375/240.16 |
| 2013/0266067 A1 | 10/2013 | Song |
| 2017/0041607 A1 | 2/2017 | Song |
| 2017/0251219 A1 | 8/2017 | Song |
| 2020/0077110 A1 | 3/2020 | Zhang |
| 2021/0185352 A1 | 6/2021 | Kalva |
| 2021/0195200 A1* | 6/2021 | Chen .................... H04N 19/543 |

FOREIGN PATENT DOCUMENTS

| | | |
|---|---|---|
| CN | 112135145 A | 12/2020 |
| CN | 112369028 A | 2/2021 |

OTHER PUBLICATIONS

English translation of the Written Opinion of the International Search Authority in the international application No. PCT/CN2021/112852, mailed on May 12, 2022, 10 pages with English translation.

Wang Zhao et al: "Three-Zone Segmentation-Based Motion Compensation for Video Compression", IEEE Transactions on Image Processing, IEEE, USA, vol. 28, No. 10, Oct. 1, 2019 (Oct. 1, 2019), pp. 5091-5104, XP011740247, ISSN: 1057-7149, DOI: 10.1109/TIP.2019.2910382 [ retrieved on Aug. 14, 2019], sections II, III.C, III.D and III.E table II, figure 12.

Supplementary European Search Report in the European application No. 21953661.2, mailed on May 12, 2025, 11 pages.

* cited by examiner

INTER-FRAME PREDICTION METHOD, CODER, DECODER, AND STORAGE MEDIUM

CROSS-REFERENCE TO RELATED APPLICATION

This application is a continuation of International Patent Application No. PCT/CN2021/112852 filed on Aug. 16, 2021, the content of which is hereby incorporated by reference in its entirety.

BACKGROUND

In the field of video encoding and decoding, during encoding and decoding for a current block, an inter prediction mode, in addition to an intra prediction mode, may be used. The inter prediction may include an inter Geometric Partitioning Mode (GPM) and a translational prediction, etc.

In natural videos, irregular textures and motions appear in large numbers, and changes of textures, edges of motion objects or edges of same motion regions are irregular in many cases. For regions with complex textures or motions, smaller blocks tend to be used. At this time, the deeper the block partitioning level is, the more complex blocks which are closer to actual textures or motions can be partitioned into, but accordingly, the complexity will greatly increase, thereby reducing the encoding and decoding performance.

SUMMARY

Embodiments of the present disclosure relate to the field of image processing technologies, and particularly to an inter prediction method, an encoder, a decoder and a storage medium.

Embodiments of the present disclosure provide an inter prediction method, an encoder, a decoder and a storage medium, which can reduce the complexity on the basis of improving the accuracy of the inter prediction, realize a simple and efficient encoding and decoding method, and thus improving the compression performance.

The technical solutions of the embodiments of the present disclosure can be implemented as follows.

In a first aspect, an embodiment of the present disclosure provides a method for inter prediction, which is applied to a decoder. The method includes the following operations.

A bitstream is decoded to determine an inter prediction mode parameter for a current block. When the inter prediction mode parameter indicates that an Adaptive partitioning Mode (APM) is used for the current block to determine an inter prediction value of the current block, at least one first reference block and at least one second reference block for the current block are determined. The APM is used for partitioning of arbitrary shapes based on picture contents, and the partitioning is an actual partitioning or a simulated partitioning. A prediction value of the current block is determined according to the at least one first reference block and the at least one second reference block.

Herein, the operation of determining the prediction value of the current block according to the at least one first reference block and the at least one second reference block includes that: a weight value according to the at least one first reference block is determined, and the prediction value of the current block is determined based on the weight value, the at least one first reference block and the at least one second reference block. Herein, the at least one first reference block comprises a first block and a second block.

In a second aspect, an embodiment of the present disclosure provides a method for inter prediction, which is applied to an encoder. The method includes the following operations.

An inter prediction mode parameter for a current block is determined. When the inter prediction mode parameter indicates that an Adaptive partitioning Mode (APM) is used for the current block to determine an inter prediction value of the current block, at least one first reference block and at least one second reference block for the current block are determined. The APM is used for partitioning of arbitrary shapes based on picture contents, and the partitioning is an actual partitioning or a simulated partitioning. A prediction value of the current block is determined according to the at least one first reference block and the at least one second reference block.

Herein, the operation of determining the prediction value of the current block according to the at least one first reference block and the at least one second reference block includes that: a weight value according to the at least one first reference block is determined, and the prediction value of the current block is determined based on the weight value, the at least one first reference block and the at least one second reference block. Herein, the at least one first reference block comprises a first block and a second block.

In a sixth aspect, an embodiment of the present disclosure provides a decoder, and the decoder includes a first processor and a first memory storing instructions executable by the first processor, where when the instructions are executed, the first processor implements the method for inter prediction as described in the first aspect above.

DETAILED DESCRIPTION

Figure 1:
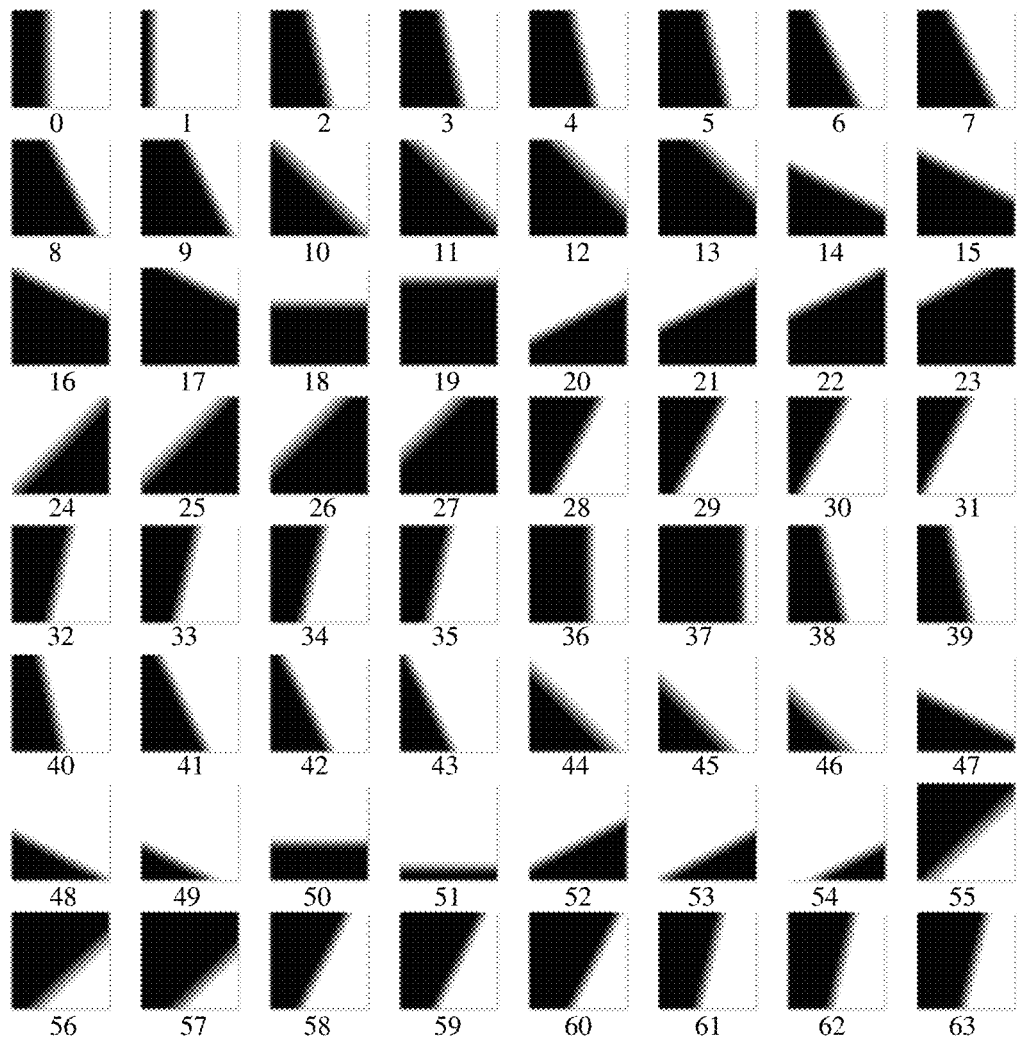
FIG. 1 is a schematic diagram of a weight distribution.

The technical solution in the embodiments of the present disclosure will be clearly and completely described as follow in combination with the accompanying drawings in the embodiments of the present disclosure. It should be understood that the specific embodiments described herein are intended only to explain the relevant disclosure and not to limit the disclosure. In addition, it should be noted that only portions related to the relevant disclosure are shown in the accompanying drawings for case of description.

At present, the general video encoding and decoding standards are based on block-based hybrid coding framework. Each video picture is partitioned into Largest Coding Units (LCUs) or Coding Tree Units (CTUs) which are squares with the same size (for example, 128×128, 64×64, etc.), each LCU or CTU may also be partitioned into rectangular Coding Units (CUs) according to rules, and the coding unit may be further partitioned into smaller Prediction Units (PUs). Specifically, the hybrid coding framework may include a Prediction module, a Transform module, a Quantization module, an Entropy Coding module, an In Loop Filter module and other modules. The prediction module may include an intra prediction and an inter prediction, and the inter prediction may include a motion estimation and a motion compensation. Because there is a strong correlation between neighbouring pixels in a video picture, the spatial redundancy between the neighbouring pixels can be eliminated by using the intra prediction mode in video coding and decoding technologies. However, because there is a strong similarity between neighbouring pictures in the video picture, the temporal redundancy between the neighbouring pictures is eliminated by using the inter prediction mode in video coding and decoding technologies, so that the encoding and decoding efficiency can be improved.

The basic flow of the video codec is as follows. At the encoding end, a picture is partitioned into blocks, an intra prediction or an inter prediction is performed on a current block to generate a prediction block of the current block, the prediction block is subtracted from an original block of the current block to obtain a residual block, the residual block is transformed and quantized to obtain a quantization coefficient matrix, and the quantization coefficient matrix is subjected to entropy coding and output to a bitstream. At the decoding end, an intra prediction or an inter prediction is performed on a current block to generate a prediction block of the current block, and on the other hand, a bitstream is decoded to obtain a quantization coefficient matrix, the quantization coefficient matrix is inversely quantized and inversely transformed to obtain a residual block, and the prediction block and the residual block are added to obtain a reconstructed block. A reconstructed picture is composed of reconstructed blocks, and picture-based or block-based in loop filtering is performed on the reconstructed picture to obtain a decoded picture. The encoding end also needs similar operations to the decoding end to obtain the decoded picture. The decoded picture may serve as a reference picture for inter prediction, for subsequent pictures. Block partitioning information, prediction information, transform information, quantization information, entropy coding information, in-loop filter information and other mode information or parameter information determined by the encoding end are output to the bitstream if necessary. The decoding end, by parsing and analyzing existing information, determines the same block partitioning information, prediction information, transform information, quantization information, entropy coding information, in-loop filter information and other mode information or parameter information as those at the encoding end, so as to ensure that the decoded picture obtained by the encoding end is the same as the decoded picture obtained by the decoding end. The decoded picture obtained by the encoding end is usually referred to as the reconstructed picture. The current block may be partitioned into prediction units during predicting, the current block may be partitioned into transform units during transforming, and the partitioning of the prediction unit and the transformation unit may be different. The above is the basic flow of the video codec under the block-based hybrid coding framework. With the development of the technology, some modules or steps of the framework or the flow may be optimized. The embodiments of the present disclosure are applicable to, but are not limited to, the basic flow of the video codec under the block-based hybrid coding framework.

The current block may be a current coding unit (CU) or a current prediction unit (PU) or the like.

The inter prediction uses the temporal correlation to eliminate the redundancy. In order to make people invisible to the frozen, the common video frame rate may be 30 pictures per second, 50 pictures per second, 60 pictures per second or even 120 pictures per second. In such a video, the correlation between neighbouring pictures in the same scene is very high, and the inter prediction technology uses this correlation to predict the content to be encoded by referring to the content of the encoded and decoded pictures. The inter prediction can greatly improve the coding performance.

The most basic inter prediction method is a translational prediction. The translational prediction assumes that the content to be predicted is translated between the current picture and the reference picture. For example, the content of a current block (a coding unit or a prediction unit) is translated between the current picture and the reference picture, so that this content may be found from the reference picture through a Motion Vector (MV) and used as a prediction block of the current block. The translation motion accounts for a large proportion in the video, and the static background, the whole translational object and the translation of the lens may all be processed by the translational prediction.

Because the video is represented by pixels, and there is a distance between pixels, the motion of an object may not always correspond to an integer pixel distance between neighbouring pictures. For example, for a distant view video, the distance between two pixels is 1 meter on the distant view object, but the distance that this object has moved in the time between two pictures is 0.5 meters, so that this kind of scene cannot be well represented by an integer-pixel motion vector. Therefore, the motion vector may arrive a fractional pixel level, such as a ½ pixel accuracy, a ¼ pixel accuracy and a ⅛ pixel accuracy, so that the motion is expressed more finely. Pixel values of fractional-pixel positions in the reference picture are obtained through the interpolation method.

However, some contents in a natural video are often not obtained by a simple translation, for example, there are some subtle changes during the process of the translation, including changes in shape and color. In a bidirectional prediction, two reference blocks are found from a reference picture, and weighted average is performed on the two reference blocks to obtain a prediction block as similar as possible to the current block. For example, for some scenes, a reference block before the current picture and a reference block after the current picture are found respectively, and weighted average is performed on the two reference blocks, and a result obtained therefrom may be more like the current block than that obtained by using a single reference block. Based on the bidirectional prediction, the compression performance is further improved on the basis of unidirectional prediction.

Both the unidirectional prediction and the bidirectional prediction in the translational prediction described above are based on a block, such as a coding unit or a prediction unit. That is, a pixel matrix is used as a unit for prediction. The most basic block is a rectangular block, such as a square and a rectangle. Video encoding and decoding standards, such as the High Efficiency Video Coding (HEVC), allow the encoder to determine the size and partition mode of a coding unit and a prediction unit according to contents of a video. It is expected to use larger blocks for regions with simple textures or motions, and it is expected to use smaller blocks for regions with complex textures or motions. The deeper the block partitioning level is, the more complex blocks which are closer to actual textures or motions can be partitioned, but accordingly, the overhead for representing these partitions is also greater.

In natural videos, irregular textures and motions appear in large numbers, and changes of textures, edges of motion objects or edges of same motion regions are irregular in many cases. Partitioning of rectangular blocks cannot achieve a trade-off in good compression performance when dealing with this situation. Many distortions in the video encoding and decoding occur in such edge regions. Geometric partitioning solves this problem to a certain extent. Blocks with triangle, trapezoid or other shapes may be partitioned by geometric partitioning, so as to better approximate the changes of the texture, the edges of the motion objects or the edges of the same motion regions. In the common geometric partitioning, on the basis of a rectangular block, the rectangular block is partitioned into triangle blocks or trapezoid blocks by using a straight line whose position and angle can be set according to certain rules, such as Geometric Partitioning Mode (GPM) in Versatile Video Coding (VVC). For the partitioning mentioned here, the coding units and the prediction units with triangle, trapezoid and other shapes may be partitioned in actuality. The coding units and the prediction units with triangle, trapezoid and other shapes may be not partitioned in actuality, but the partitioning is simulated by weighted combination according to the weight matrix, such as the way the GPM of the VVC is used.

For example, FIG. 1 is a schematic diagram of a weight distribution. As shown in FIG. 1, an embodiment of the present disclosure provides a schematic diagram of a weight distribution of a plurality of partition modes of GPM on a current block of 64×64, and the GPM has 64 partition modes. In each partition mode, the black region indicates that a weight value of a position corresponding to a first reference block is 0%, the white region indicates that the weight value of the position corresponding to the first reference block is 100%, the gray area indicates that the weight value of the position corresponding to the first reference block is a certain weight value greater than 0% and less than 100% according to different color shades, and a weight value of a position corresponding to a second reference block is 100% minus the weight value of the position corresponding to the first reference block.

The reason why the geometric partitioning solves the compression performance problem of the block partition under irregular textures and motions to a certain extent is that certain overhead is also needed to represent partition modes of the geometric partitioning. For example, the above 64 geometric partition modes require an overhead of 6-bit binary symbol strings (bin), which moreover is still not guaranteed to completely fit the edges of the irregular textures and motion regions, because the more partition modes supported by the GPM are, the greater the overhead is required. The above 64 modes are a better trade-off achieved in the VVC. Moreover, the above partition only supports straight lines, and it is still necessary to partition smaller rectangular blocks for irregular edges and use GPM to approximate the irregular edges on the basis of the rectangular blocks, or distortions are reduced by encoding more residuals.

In the final analysis, the rectangular partition and the geometric partition are artificially predefined partition modes. It is easy to process the artificially predefined partition modes, because the partition mode may be determined only by decoding a partition flag. However, the limitation of the predefined partition mode is that it can only realize a limited number of partition modes, and the number will not be particularly large considering the cost.

With respect to the above problems, an inter prediction method is proposed at present, based on the APM, an encoder or a decoder may obtain at least one first reference block and at least one second reference block, then perform the partitioning of arbitrary shapes through the at least one first reference block, and finally perform prediction on a current block in combination with the at least one first reference block and the at least one second reference block, so that an inter prediction in which the video contents are adaptively partitioned is implemented, which can reduce the complexity on the basis of improving the accuracy of the inter prediction, and realize a simple and efficient encoding and decoding method, thereby improving the compression performance.

Figure 2:
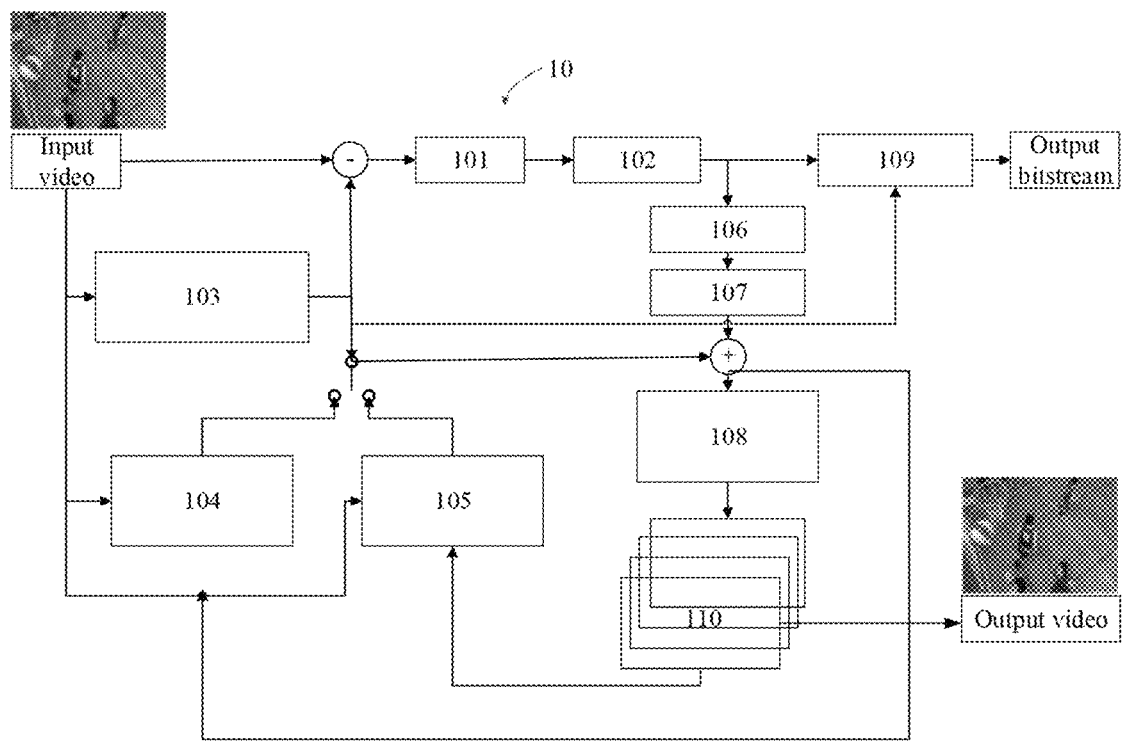
FIG. 2 is a composition block diagram of a video encoding system.

FIG. 2 illustrates an example of a composition block diagram of a video encoding system provided by an embodiment of the present disclosure. As shown in FIG. 2, the video encoding system 10 includes a transform and quantization unit 101, an intra estimation unit 102, an intra prediction unit 103, a motion compensation unit 104, a motion estimation unit 105, an inverse transform and inverse quantization unit 106, a filter control and analysis unit 107, a filtering unit 108, a coding unit 109 and a decoded picture buffer unit 110, etc. The filtering unit 108 can implement a DeBlocking Filtering (DBF) and a SAO filtering, and the coding unit 109 can implement head information coding and Context-based Adaptive Binary Arithmetic Coding (CABAC). For an input original video signal, a video coding block can be obtained by partitioning the original video signal through a Coding Tree Unit (CTU), and then the video coding block is transformed by the transform and quantization unit 101 based on residual picture information obtained after an intra prediction or an inter prediction, including transforming the residual information from a picture domain to a transform domain, and quantizing obtained transform coefficients to further reduce a bit rate. The intra estimation unit 102 and the intra prediction unit 103 are used to perform intra prediction on the video coding block, and specifically, the intra estimation unit 102 and the intra prediction unit 103 are used to determine an intra prediction mode to be used to encode the video coding block. The motion compensation unit 104 and the motion estimation unit 105 are used to perform inter prediction coding of the received video coding block with respect to one or more blocks of one or more reference pictures to provide temporal prediction information. A motion estimation performed by the motion estimation unit 105 is a process of generating motion vectors that can be used to estimate the motion of the video coding block, and then a motion compensation is performed by the motion compensation unit 104 based on the motion vectors determined by the motion estimation unit 105. After determining the intra prediction mode, the intra prediction unit 103 is further used to provide selected intra prediction data to the coding unit 109, and the motion estimation unit 105 transmits the motion vector data determined by calculation to the coding unit 109. Furthermore, the inverse transform and inverse quantization unit 106 is used for reconstruction of the video coding block, a residual block is reconstructed in the picture domain. Blocking artifacts in the reconstructed residual block are removed through the filter control and analysis unit 107 and the filtering unit 108, and then the reconstructed residual block is added to a prediction block in a picture of the decoded picture buffer unit 110, to generate a reconstructed video coding block. The coding unit 109 is used for encoding various encoding parameters and quantized transform coefficients. In a CABAC-based coding algorithm, contextual contents can be based on neighbouring coding blocks. The coding unit 109 can be used to code information indicating the determined intra prediction mode, and output a bitstream of the video signal. The decoded picture buffer unit 110 is used to store the reconstructed video coding block for a prediction reference. As the video picture encoding performs, new reconstructed video coding blocks are continuously generated and all of these reconstructed video coding blocks are stored in the decoded picture buffer unit 110.

Figure 3:
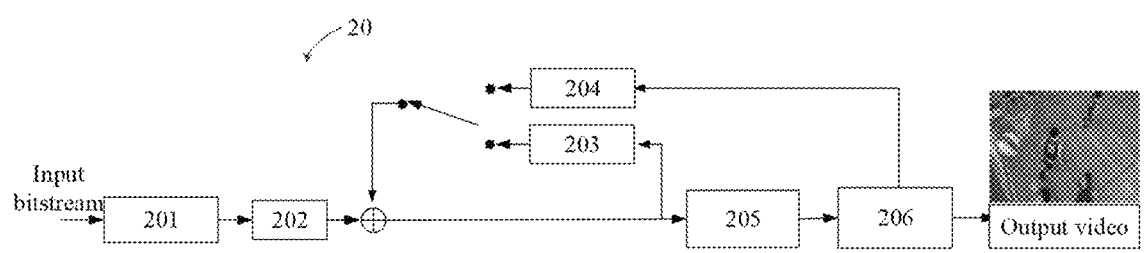
FIG. 3 is a composition block diagram of a video decoding system.

FIG. 3 illustrates an example of a composition block diagram of a video encoding system provided by an embodiment of the present disclosure. As shown in FIG. 3, the video decoding system 20 includes a coding unit 201, an inverse transform and inverse quantization unit 202, an intra prediction unit 203, a motion compensation unit 204, a filtering unit 205 and a decoded picture buffer unit 206, etc. The coding unit 201 can implement a head information decoding and a CABAC decoding, and the filtering unit 205 can implement a DBF filtering and a SAO filtering. After an input video signal is encoded as described in FIG. 2, a bitstream of the video signal is outputted. The bitstream is inputted into the video decoding system 20, and firstly passes through the coding unit 201 to obtain decoded transform coefficients. The transform coefficients are processed by the inverse transform and inverse quantization unit 202 to generate a residual block in a picture domain. The intra prediction unit 203 can be used to generate prediction data of a current video decoded block based on the determined intra prediction mode and data from previously decoded block of a current picture or image. The motion compensation unit 204 is used to determine prediction information for the video coding block by parsing motion vectors and other associated syntax elements, and use the prediction information to generate a prediction block of the video coding block that is being decoded. A decoded video block is formed by summing the residual block from the inverse transform and inverse quantization unit 202 and the corresponding prediction block generated by the intra prediction unit 203 or the motion compensation unit 204. Blocking artifacts in the decoded video signal are removed through the filtering unit 205, so that the video quality can be improved. Then, the decoded video block is stored in the decoded picture buffer unit 206. The decoded picture buffer unit 206 stores a reference picture(s) for subsequent intra prediction or motion compensation, and at the same time, the decoded picture buffer unit 206 is also used to output the video signal, i.e. a recovered original video signal is obtained.

The inter prediction method in the embodiments of the present disclosure can be applied to a video encoding system or a video decoding system, or can be applied to a video encoding system and a video decoding system at the same time, which are not specifically limited in the embodiments of the present disclosure. It should also be noted that when the inter prediction method is applied to a video encoding system, the "current block" specifically refers to a current encoded block in the inter prediction; and when the inter prediction method is applied to a video decoding system, the "current block" specifically refers to a current decoded block in the inter prediction.

The technical solution in the embodiments of the present disclosure will be clearly and completely described as follow in combination with the accompanying drawings in the embodiments of the present disclosure.

Figure 4:
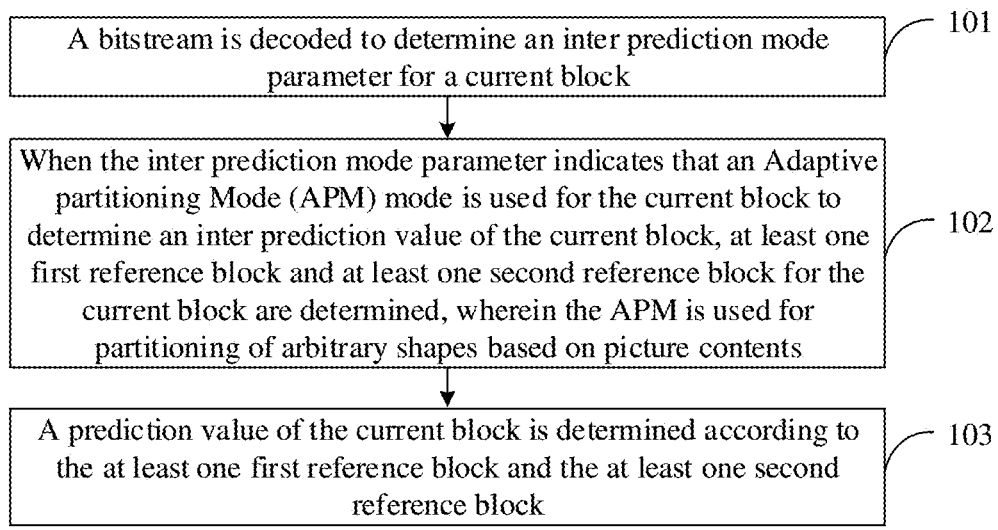
FIG. 4 is a first schematic flowchart of implementation of a method for inter prediction.

An embodiment of the present disclosure provides an inter prediction method, which is applied to a decoder. FIG. 4 is a first schematic flowchart of implementation of a method for inter prediction. As shown in FIG. 4, the method for inter prediction performed by the decoder may include the following operations.

At operation 101, a bitstream is decoded to determine an inter prediction mode parameter for a current block.

In an embodiment of the present disclosure, the decoder may determine the inter prediction mode parameter for the current block by decoding the bitstream.

It should be noted that in embodiments of the present disclosure, the inter prediction mode parameter may indicate that whether an Adaptive partitioning Mode (APM) can be used for the current block, that is, indicating that whether two different reference blocks can be used for the current block to irregularly partition the current block.

It should be understood that in the embodiment of the present disclosure, the inter prediction mode parameter may be understood as a flag bit indicating whether the APM is used. Specifically, the decoder decodes the bitstream, and determines a variable that is used as the inter prediction mode parameter, so that the determination of the inter prediction mode parameter may be realized by taking the value of the variable.

It should be noted that in the embodiment of the present disclosure, the APM is an inter prediction method. Specifically, in the APM, at least one first reference block and at least one second reference block are determined for a current block, then a weight value may be determined, the at least one first reference block and the at least one second reference block are combined according to the weight value, and finally a new prediction block may be obtained, that is, the prediction block of the current block may be obtained. The first reference block may be used as a foreground reference block and the second reference block may be used as a background reference block.

Furthermore, in the embodiment of the present disclosure, the APM may be used for partitioning of arbitrary shapes based on picture contents, that is, the inter prediction method proposed in the present disclosure may be an adaptive partitioning mode according to video contents. In the present disclosure, the partitioning is a generalized partitioning, which may refer to an actual partitioning of a coding unit or a prediction unit, or may also refer to a simulated partitioning in which a weighted combination may be performed by using the weight value or other ways in the same coding unit or prediction unit.

That is to say, in the embodiment of the present disclosure, the partitioning of arbitrary shapes realized based on the APM may be an actual partitioning or a simulated partitioning.

It should be noted that in the embodiment of the present disclosure, a video picture may be partitioned into multiple picture blocks, and the current block is each current picture block to be encoded, which can be referred to as a Coding Block (CB). Here, each CB may include a first picture component, a second picture component and a third picture component. Specifically, in the present disclosure, assuming that the first picture component is predicted and the first picture component is a luma component, i.e., a picture component to be predicted is a luminance component, an encoded block to be predicted may be referred to as a luminance block. Alternatively, assuming that the second picture component is predicted and the second picture component is a chroma component, i.e., the picture component to be predicted is a chroma component, the encoded block to be predicted may be referred to as a chroma block.

For example, in the present disclosure, there may be a frame-level flag to determine whether the APM is used for a current frame to be decoded. For example, it may be configured that the APM is used for intra pictures (such as I pictures), and the APM is not used for inter pictures (such as B pictures, P pictures). Alternatively, it may be configured that the APM is not used for intra pictures, and the APM is used for inter pictures. Alternatively, it may be configured that the APM is used for some intra pictures and the APM mode is not used for some intra pictures.

For example, in the present disclosure, there may be a block-level flag to determine whether the APM is used for the block. For example, there may be a CU-level flag or a PU-level flag to determine whether the APM is used for the block. Further, there may be one or more flags of a sequence level, a picture level or below a picture level and above a CU level (such as a tile level, a slice level, a patch level, a LCU level, a CTU level, etc.) to determine whether the AMP is possible or allowed for this region, and if this or these flags indicate that the AMP is possible or allowed for the current region, then whether the APM is used for this block is determined according to the CU-level flag or PU-level flag.

At operation 102, when the inter prediction mode parameter indicates that an APM is used for the current block to determine an inter prediction value of the current block, at least one first reference block and at least one second reference block are determined for the current block. The APM mode is used for partitioning of arbitrary shapes based on picture contents.

In an embodiment of the present disclosure, after determining the inter prediction mode parameter for the current block, the decoder may further determine the at least one first reference block and the at least one second reference block for the current block if the inter prediction mode parameter indicates that the APM is used for the current block to determine the inter prediction value of the current block.

It should be noted that in the embodiment of the present disclosure, if it is determined to use the APM, determination of a reference block(s) is needed at first. Specifically, one or more foreground reference blocks, i.e., at least one first reference block, of the current block may be determined, and one or more background reference blocks, i.e., at least one second reference block, of the current block need to be determined at the same time.

It should be understood that in the embodiment of the present disclosure, the at least one first reference block may be used for predicting foreground contents of the current block, and the at least one second reference block may be used for predicting background contents of the current block. Thus, in the present disclosure, the first reference block may be represented as a foreground reference block and the second reference block may be represented as a background reference block.

Furthermore, in an embodiment of the present disclosure, the determination of different first reference blocks may be performed based on at least one different reference picture, i.e., the at least one first reference block is respectively from different reference pictures. Accordingly, in the present disclosure, the determination of the at least one second reference block may be performed based on at least one different reference picture, i.e., the at least one second reference block is respectively from different reference pictures. Any one of the at least one reference pictures used for determining the at least one second reference block may be different from or the same as any one of the at least one reference pictures used for determining the at least one first reference block.

That is to say, in the present disclosure, the at least one first reference block may be determined according to the at least one first reference picture, and the at least one second reference block may be determined according to the at least one second reference picture. The at least one first reference picture may be different from the at least one second reference picture. Alternatively, the at least one first reference picture is different from each other, the at least one second reference picture is also different from each other, and at least one picture of the at least one first reference picture is the same as at least one picture of the at least one second reference picture.

Figure 5:
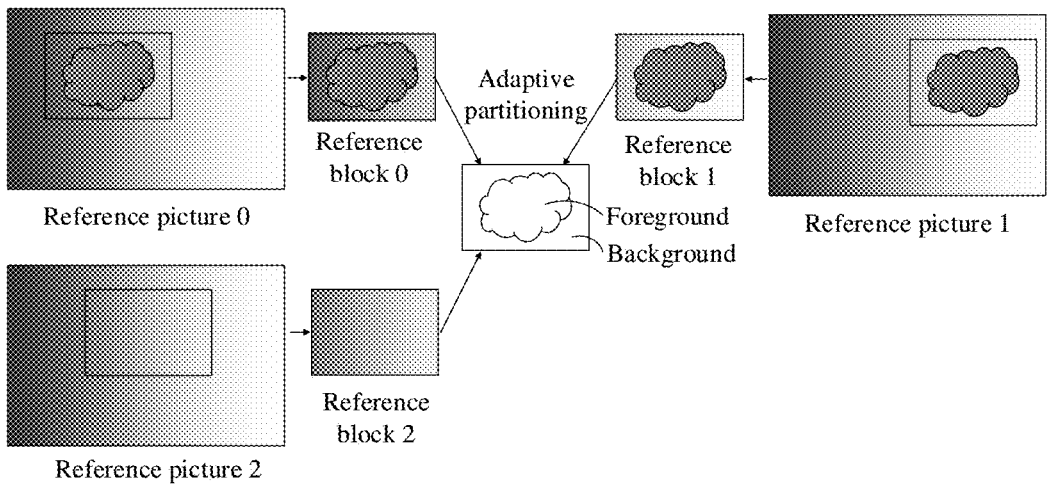
FIG. 5 is a first schematic diagram of obtaining a reference block.

For example, in an embodiment of the present disclosure, FIG. 5 is a first schematic diagram of obtaining a reference block. As shown in FIG. 5, a corresponding reference block 0 (a first reference block, i.e., a foreground reference block) may be obtained based on a reference picture 0 (a first reference picture), a corresponding reference block 1 (another first reference block, i.e., another foreground reference block) may be obtained based on a reference picture 1 (another first reference picture), and a corresponding reference block 2 (a second reference block, i.e., a background reference block) may be obtained based on a reference picture 2 (a second reference picture). An adaptive partitioning may be determined according to the reference block 0 and the reference block 1, for example, a weight value may be generated using the reference block 0 and the reference block 1, and then the adaptive partitioning may be simulated through the weight value.

Figure 6:
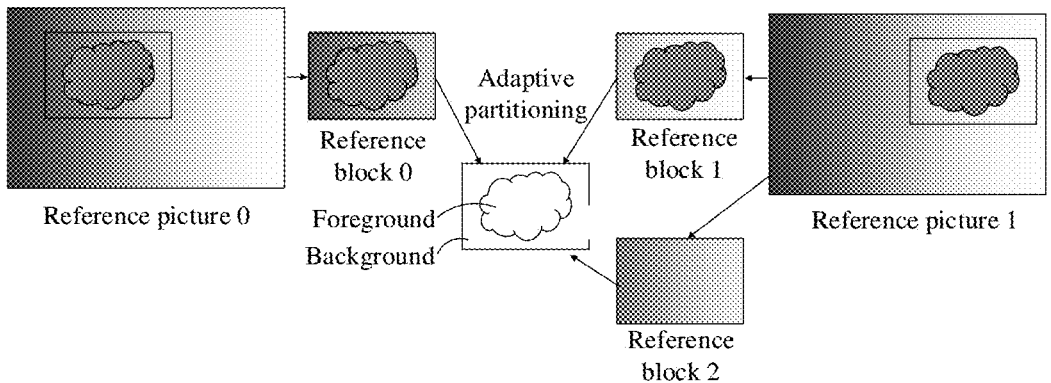
FIG. 6 is a second schematic diagram of obtaining a reference block.

For example, in an embodiment of the present disclosure, FIG. 6 is a second schematic diagram of obtaining a reference block. As shown in FIG. 6, a corresponding reference block 0 (a first reference block, i.e., a foreground reference block) may be obtained based on a reference picture 0 (a first reference picture), a corresponding reference block 1 (another first reference block, i.e., another foreground reference block) and reference block 2 (a second reference block, i.e., a background reference block) may be obtained based on a reference picture 1 (a first reference picture is the same as a second reference picture). An adaptive partitioning may be determined according to the reference block 0 and the reference block 1, for example, a weight value may be generated using the reference block 0 and the reference block 1, and then the adaptive partitioning may be simulated through the weight value.

Figure 7:
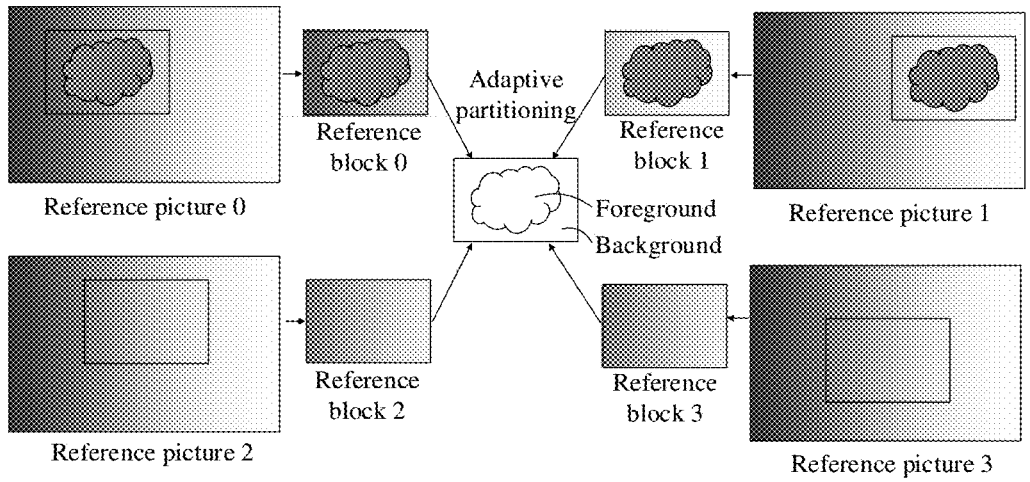
FIG. 7 is a third schematic diagram of obtaining a reference block.

For example, in an embodiment of the present disclosure, FIG. 7 is a third schematic diagram of obtaining a reference block. As shown in FIG. 7, a corresponding reference block 0 (a first reference block, i.e., a foreground reference block) may be obtained based on a reference picture 0 (a first reference picture), a corresponding reference block 1 (another first reference block, i.e., another foreground reference block) may be obtained based on a reference picture 1 (another first reference picture), a corresponding reference block 2 (a second reference block, i.e., a background reference block) may be obtained based on a reference picture 2 (a second reference picture), and a corresponding reference block 3 (another second reference block, i.e., another background reference block) may be obtained based on a reference picture 3 (another second reference picture). An adaptive partitioning may be determined according to the reference block 0 and the reference block 1, for example, a weight value may be generated using the reference block 0 and the reference block 1, and then the adaptive partitioning may be simulated through the weight value.

Furthermore, in the embodiment of the present disclosure, the current block, the at least one first reference block and the at least one second reference block are picture blocks with a same size.

It should be noted that in the present disclosure, in order to reduce the processing complexity of the codec, it can be considered that the size of each reference block is the same as that of the current block. However, it is not required to obtain a complete reference block. For example, a reference block containing foreground contents only needs to contain contents that are enough to determine the weight value for the adaptive partitioning, and a reference block containing background contents only needs to contain enough background contents. Particularly for the reference block containing background contents, only the desired part needs to be determined according to the weight value.

It should be understood that in an embodiment of the present disclosure, the current block and the at least one first reference block have entirely or partly same foreground contents, respectively, so that the foreground portion can be predicted using the at least one first reference block. The current block and the at least one the second reference block have entirely or partly same background contents, so that the background portion can be predicted using the at least one second reference block.

It should be noted that in the present disclosure, the foreground contents may be understood as foreground objects contained in the current block, and the background contents may be understood as background objects contained in the current block. In particular, the at least one first reference block may contain contents of the foreground objects or contents of a part of the foreground objects contained in the current block, and the current block may contain only a part of the foreground objects, so the at least one first reference block may also contain only this part of the foreground objects. The at least one second reference block may contain contents of the background objects or contents of a part of the background objects contained in the current block, and the current block may contain only a part of the background objects, so the at least one second reference block may also contain only this part of the foreground objects.

It should be understood that in embodiments of the present disclosure, the at least one first reference block may be a reference block(s) containing foreground contents in the current block, which may be understood as a reference block(s) containing a best match of the foreground contents in the current block, or a reference block(s) containing a match of the foreground contents in the current block. The at least one second reference block may be a reference block(s) containing background contents in the current block, which may be understood as a reference block(s) containing a best match of the background contents in the current block, or a reference block(s) containing a match of the background contents in the current block.

Furthermore, in the embodiments of the present disclosure, the determination of the at least one first reference block and the at least one second reference block for the current block may be performed in multiple different manners, which are not specifically limited in the embodiments of the present disclosure.

Optionally, in the present disclosure, when determining the at least one first reference block and the at least one second reference block for the current block, the at least one first reference picture and the at least one second reference picture may be determined at first. Then, the at least one first reference block is determined directly according to the at least one first reference picture, and the at least one second reference block is determined according to the at least one second reference picture.

That is to say, in the present disclosure, it may be selected that the acquisition of the reference block is directly performed from the reference picture.

Optionally, in the present disclosure, when determining the at least one first reference block and the at least one second reference block for the current block, at least one piece of first motion information and at least one piece of second motion information may be determined at first. Then, the at least one first reference block and the at least one second reference block are determined based on the at least one piece of the first motion information and the at least one piece of the second motion information.

That is to say, in the present disclosure, it is possible to select to acquire the motion information at first and then acquire the reference block from the reference picture using the determined motion information. Specifically, in order to obtain multiple reference blocks, it is necessary to obtain multiple piece of motion information at first, where one piece of motion information is used to obtain one reference block, and the multiple piece of motion information may be obtained using different methods, which are not specifically limited in the present disclosure.

It should be noted that in the embodiment of the present disclosure, the motion information may be a motion vector, that is, the first motion information and the second motion information each may include a first motion vector and a second motion vector respectively.

Furthermore, in the embodiment of the present disclosure, when determining the at least one piece of first motion information and the at least one piece of second motion information, at least one piece of first initial motion information and at least one piece of second initial motion information may be determined at first. Then the at least one piece of first initial motion information and the at least one piece of second initial motion information may be refined, respectively, so as to obtain at least one piece of first motion information and at least one piece of second motion information.

It should be understood that in the present disclosure, the at least one piece of first initial motion information and the at least one piece of second initial motion information may include a first initial motion vector and a second initial motion vector respectively.

Specifically, in the embodiment of the present disclosure, the refining of the motion information may be performed through various methods, for example, the refining of the motion information may be performed through techniques, such as a Decoder side motion vector refinement (DMVR) or a Decoder side motion vector derivation (DMVD). For the DMVR, when performing a bidirectional prediction, a motion vector MV0 and a motion vector MV1 are taken as initial MVs, more accurate MV0' and MV1' are searched for near the MV0 and the MV1 respectively, and then prediction blocks pointed by the MV0 and the MV1 are weighted to obtain a final prediction block.

Optionally, in the present disclosure, the at least one piece of the first initial motion information and the at least one piece of the second initial motion information may be refined by utilizing the DMVR. Alternatively, the at least one piece of the first initial motion information and the at least one piece of the second initial motion information may be refined by utilizing the DMVD. The motion information may be refined by utilizing other techniques, which are not specifically limited in the present disclosure.

That is to say, in the present disclosure, the APM may also be used in conjunction with the search method at decoding end. For example, after obtaining initial motion information, the DMVR, the DMVD and other technologies may be used to refine the motion information at first. For example, for two reference blocks containing foreground contents, the DMVR is used to search in a small range for a better match, and a more accurate prediction block may be obtained in a case that the motion information is not accurate enough.

It should be understood that the bandwidth of a reference picture region for the inter prediction has an important influence on the hardware performance during current hardware implementation. In traditional unidirectional prediction, one piece of motion information needs to be used to obtain one reference block from the reference picture, while in traditional bidirectional prediction, two piece of motion information need to be used to obtain two reference blocks from the reference picture. The worst case is that the bidirectional prediction requires a bandwidth about twice as that in the unidirectional prediction. The worst case of the requirement to the bandwidth in sub-block-based prediction also increases compared with block-based prediction, because obtaining different reference blocks in the sub-block-based prediction will use different motion information.

It should be noted that in the present disclosure, based on the APM, multiple reference blocks (at least one first reference block and at least one second reference block) need to be determined by using multiple pieces of motion information, which requires a larger bandwidth than traditional bidirectional prediction. In order to reduce the bandwidth to a certain extent, any number of the second reference blocks reference_back containing background contents and any number of the first reference blocks reference_fore containing foreground contents may be limited to be provided on a same reference picture, and a distance between them is relatively close, because the foreground contents and the background contents of the current block and the foreground contents and the background contents on the reference picture are obtained by moving for a very short time (a few tenths of a second or less). Accordingly, in the present disclosure, without the aforementioned limitation, multiple pieces of motion information may correspond to multiple different reference pictures, i.e., multiple reference blocks are respectively from multiple different reference pictures.

Specifically, in the embodiment of the present disclosure, it may be limited that the reference picture(s) corresponding to the at least one piece of the second motion information is the same as the reference picture(s) corresponding to the at least one piece of the first motion information, and an absolute value of a vector difference between the at least one piece of the second motion information and the at least one piece of the first motion information is less than or equal to a first threshold value.

Optionally, in an embodiment of the present disclosure, assuming that two first reference blocks (foreground reference blocks) for the current block have been determined to be reference_fore_0 and reference_fore_1, respectively, and one second reference block (background reference block) has been determined to be reference_back, it may be limited that the motion information motion_infor_back for determining the reference_back and one of the motion information motion_infor_fore_0 or the motion information motion_ infor_fore_1 for determining the reference_fore_0 or the reference_fore_1 need to correspond to a same reference picture, and an absolute value of a motion vector difference between the two pieces of motion information is less than or equal to a threshold value (the first threshold value), thereby realizing a limitation on a bandwidth to reduce the bandwidth.

For example, in the present disclosure, it is limited that the motion information motion_infor_back for determining the reference_back and the motion information motion_infor_ fore_0 for determining the reference_fore_0 correspond to the same reference picture, and the absolute value of the motion vector difference between the motion_infor_back and the motion_infor_fore_0 is less than or equal to the first threshold value.

Furthermore, in the embodiment of the present disclosure, if it is limited that the reference picture corresponding to the at least one piece of the second motion information is the same as the reference picture corresponding to the at least one piece of the first motion information, and the absolute value of the vector difference between the at least one piece of the second motion information and the at least one piece of the first motion information is less than or equal to the first threshold value, then when determining the at least one piece of the first motion information and the at least one piece of the second motion information, the at least one piece of the second motion information may be determined at first, and then the at least one piece of the first motion information is determined according to the first threshold value and the at least one piece of the second motion information.

Furthermore, in an embodiment of the present disclosure, if it is limited that the reference picture corresponding to the second motion information is the same as the reference picture corresponding to the first motion information or the second motion information, and the absolute value of the vector difference between the second motion information and the first motion information or the second motion information is less than or equal to the first threshold value, then when determining the at least one piece of the first motion information and the at least one piece of the second motion information, the at least one piece of the first motion information may be determined at first, and then the at least one piece of the second motion information is determined according to the first threshold value and the at least one piece of the first motion information.

Optionally, in an embodiment of the present disclosure, assuming that two first reference blocks (foreground reference blocks) for the current block have been determined to be reference_fore_0 and reference_fore_1, respectively, and one second reference block (background reference block) has been determined to be reference_back, if the motion information motion_infor_back for determining the reference_back and one of the motion information motion_infor_fore_0 or the motion information motion_infor_fore_1 for determining the reference_fore_0 or the reference_fore_1 must correspond to a same reference picture, then the motion_infor_back may be determined according to one of the motion_infor_fore_0 or the motion_infor_fore_1, or one of the motion_infor_fore_0 or the motion_infor_fore_1 may be determined according to the motion_infor_back. For example, the motion_infor_back is determined according to the motion_infor_fore_0 and a motion vector difference (such as the first threshold value). Alternatively, the motion_infor_fore_0 is determined according to the motion_infor_back and the motion vector difference (such as the first threshold value).

For example, in the present disclosure, if it is limited that the motion information motion_infor_back for determining the reference_back and the motion information motion_infor_fore_0 for determining the reference_fore_0 correspond to the same reference picture, and the absolute value of the motion vector difference between the motion_infor_back and the motion_infor_fore_0 is less than or equal to the first threshold value, the motion_infor_back may be determined at first, and then the motion_infor_fore_0 is determined according to the motion_infor_back and the first threshold value. Alternatively, the motion_infor_fore_0 may be determined at first, and then the motion_infor_back is determined according to the motion_infor_fore_0 and the first threshold value.

Furthermore, in an embodiment of the present disclosure, if it is also possible to determine a reference block in the APM using a sub-block-based prediction method, such as affine prediction or other prediction methods, then a motion vector difference within a motion vector group that is used for determining motion information of a reference block reference_fore_0 or reference_fore_1 or reference_back in the APM may be limited, for example, an absolute value of the motion vector difference within the motion vector group is limited to be less than or equal to a threshold value, thereby realizing a limitation on a bandwidth to reduce the bandwidth.

Optionally, in the present disclosure, it may be limited that an absolute value of a difference between any two piece of motion information in the at least one piece of the first motion information and the at least one piece of the second motion information is less than or equal to a second threshold value.

Furthermore, in the present disclosure, the corresponding at least one piece of the first motion information and at least one piece of the second motion information may be obtained according to information obtained by parsing the bitstream, the corresponding at least one piece of the first motion information and at least one piece of the second motion information may also be obtained according to information of neighbouring blocks of the current block, or the corresponding at least one piece of the first motion information and at least one piece of the second motion information may further be obtained according to a motion information list.

On this basis, the corresponding at least one first reference block and at least one second reference block may be further determined based on the at least one piece of the first motion information and the at least one piece of the second motion information.

Furthermore, in an embodiment of the present disclosure, when determining the at least one first reference block and the at least one second reference block based on the at least one piece of the first motion information and the at least one piece of the second motion information, at least one first reference picture and at least one second reference picture may be determined at first; then the at least one first reference picture is interpolated according to the at least one piece of the first motion information, to obtain the at least one first reference block; and the at least one second reference picture is interpolated according to the at least one piece of the second motion information, to obtain the at least one second reference block.

That is to say, in the present disclosure, when determining the reference block based on the motion information, it is possible to select to perform fractional-pixel interpolation on an integer-pixel reference picture by using the motion information so as to obtain the corresponding reference block.

Furthermore, in an embodiment of the present disclosure, when determining the at least one first reference block and the at least one second reference block based on the at least one piece of the first motion information and the at least one piece of the second motion information, at least one first reference picture and at least one second reference picture may be determined at first; then the at least one first reference picture is predicted according to the at least one piece of the first motion information, to obtain the at least one first reference block; and the at least one second reference picture is predicted according to the at least one piece of the second motion information, to obtain the at least one second reference block.

That is to say, in the present disclosure, when determining the reference block based on the motion information, it is possible to select to perform prediction (e.g. affine prediction) on the reference picture by using the motion information so as to obtain the corresponding reference block.

Thus, in the embodiments of the present disclosure, the at least one first reference block and the at least one second reference block may be integer-pixel reference blocks that are directly intercepted from the reference picture, or may be reference blocks obtained by performing the fractional-pixel interpolation on the integer-pixel reference picture based on the motion information, or may be reference blocks obtained by performing the affine prediction on the original reference picture based on the motion information, or may be reference blocks obtained by using other processing methods, which are not specifically limited in the present disclosure.

At operation 103, a prediction value of the current block is determined according to the at least one first reference block and the at least one second reference block.

In an embodiment of the present disclosure, if the inter prediction mode parameter indicates that an APM is used for the current block to determine an inter prediction value of the current block, then after the at least one first reference block and the at least one second reference block for the current block are determined, the prediction value of the current block may be further determined according to the at least one first reference block and the at least one second reference block.

Furthermore, in an embodiment of the present disclosure, when determining the prediction value of the current block according to the at least one first reference block and the at least one second reference block, a weight value may be determined according to the at least one first reference block at first, and the prediction value of the current block may then be determined based on the weight value, the at least one first reference block and the at least one second reference block.

That is to say, in the embodiment of the present disclosure, if the inter prediction mode parameter indicates that an APM is used for the current block to determine an inter prediction value of the current block, then after the at least one first reference block and the at least one second reference block for the current block are determined, the weight value may be further determined according to the at least one first reference block.

It should be noted that in an embodiment of the present disclosure, the weight value of the current block may be a weight matrix of the current block, and the weight matrix includes weight matrixes of sub-blocks of the current block or a weight value of each pixel position of the current block.

Optionally, in an embodiment of the present disclosure, the weight matrix of the current block may be determined based on the at least one first reference block, and then the prediction value of the current block may be obtained based on the weight matrix of the current block, the at least one first reference block and the at least one second reference block.

Optionally, in the embodiment of the present disclosure, when determining the prediction value of the current block, one method is to select to obtain, for each sub-block of the current block, a weight matrix of the sub-block, and then obtain a prediction value of the sub-block according to the reference blocks (the first reference block and the second reference block) and the weight matrix of the sub-block. Another method is to obtain a weight value for each position (pixel position) of the current block, and obtain a prediction value of the position according to a reference value (a pixel reference value) of each position and the weight value of each position.

In contrast, the above two methods for determining the prediction value of the current block are essentially different in processing granularity, because the weight matrix of the current block can be obtained after combining the weight matrices of the sub-blocks of the current block, and the weight matrix of the current block can also be obtained after combining the weight value of each position (pixel position) of the current block. A smaller processing granularity may save storage space.

It should be noted that in the embodiments of the present disclosure, the weight value (weight matrix) of the current block may include either the weight value corresponding to each pixel position in the current block or the weight matrix corresponding to each sub-block in the current block, that is, the weight value of the current block is essentially the weight of the sub-blocks or the weight of the pixels. That is to say, although the present disclosure is described in unit of a whole block, it is substantially included in unit of a sub-block or a pixel.

It should be noted that in the embodiment of the present disclosure, for a pixel position of the current block, a weight value corresponding to the pixel position may be determined by using the pixel value of the pixel position in the at least one first reference block, so that the weight value of the current block may be constructed after traversing each pixel position and obtaining all the weight values corresponding to all the pixel positions.

Optionally, in the embodiment of the present disclosure, assuming that the at least one first reference block includes two different reference blocks, which are respectively a first block and a second block, when determining the weight value according to the at least one first reference block, for a pixel position, at first, a first pixel value of the pixel position in the first block may be determined and a second pixel value of the pixel position in the second block may be determined at the same time. Then, a weight value corresponding to the pixel position may be determined according to the first pixel value and the second pixel value. Finally, after traversing all pixel positions and determining all weight values corresponding to all pixel positions, the weight value of the current block may be determined according to all the weight values.

For example, in the present disclosure, the first block is represented as reference_fore_0, and the second block is represented as reference_fore_1. For a pixel position (i, j), the first pixel value in the first block reference_fore_0 is reference_fore_0[i][j], and the second pixel value in the second block reference_fore_1 is reference_fore_1 [i][j]. Then, the weight value weight_matrix[i][j] corresponding to the pixel position (i, j) in the current block may be determined according to the first pixel value reference_fore_0[i][j] and the second pixel value reference_fore_1[i][j], and after determining a weight value corresponding to each pixel position, a weight matrix weight_matrix of the current block is generated according to the weight values corresponding to all pixel positions.

For example, in an embodiment of the present disclosure, the determination of the weight value weight_matrix[i][j] corresponding to the pixel position (i, j) in the current block may be performed through the following formula:

$$\text{weight\_matrix}[i][j] = \quad (1)$$
$$\text{clip3}(0, n, (\text{reference\_fore\_0}[i][j] + \text{reference\_fore\_1}[i][j])/$$
$$(\text{abs}(\text{reference\_fore\_0}[i][j] - \text{reference\_fore\_1}[i][j]) \times 8 + 1))$$

Herein, a value of n is greater than 0. It should be understood that a value of a weight value corresponding to any one pixel position is greater than or equal to 0 and less than or equal to n, i.e., the maximum value of the weight value in the weight matrix is n and the minimum value is 0.

It can be seen from the above formula (1) that the size of the weight value weight_matrix[i][j] is determined jointly by the first pixel value reference_fore_0[i][j] in the first block and the second pixel value reference_fore_1[i][j] in the second block. The closer the values of the reference_fore_0 [i][j] and the reference_fore_1[i][j] are, the greater the value of the weight value weight_matrix[i][j] is, and the greater the difference between the values of the reference_fore_0 [i][j] and the reference_fore_1[i][j] is, the smaller the value of weight value weight_matrix[i][j] is.

Furthermore, in the embodiment of the present disclosure, in order to further reduce the influence of noises, for a pixel position of the current block, the determination of the weight value corresponding to the pixel position may be performed by using the pixel value of the pixel position in the at least one first reference block (e.g., the first block and the second block) and a pixel value of a neighbouring pixel position around the pixel position, so that the weight matrix of the current block may be constructed after traversing each pixel position and obtaining all weight values corresponding to all the pixel positions.

That is to say, in the present disclosure, the weight value corresponding to one pixel position of the current block may be derived from the pixel values of multiple pixel positions in the first block and the second block. The multiple pixel positions may include the one pixel position and a neighbouring pixel position adjacent to the one pixel position.

Optionally, in the embodiment of the present disclosure, assuming that the at least one first reference block includes two different reference blocks, which are respectively a first block and a second block, when determining the weight value according to the at least one first reference block, for a pixel position, a first pixel value of the pixel position and a first neighbouring pixel value of a neighbouring pixel position of the pixel position in the first block may be determined at first, and a second pixel value of the pixel position and a second neighbouring pixel value of a neighbouring pixel position of the pixel position in the second block may be determined simultaneously. Then, a weight value corresponding to the pixel position may be determined according to the first pixel value, the first neighbouring pixel value, the second pixel value and the second neighbouring pixel value. Finally, after traversing all pixel positions and determining all weight values corresponding to all the pixel positions, the weight value of the current block may be determined according to all the weight values.

For example, in the present disclosure, the first block is represented as reference_fore_0, and the second block is represented as reference_fore_1. For a pixel position (i, j), the first pixel value in the first block is reference_fore_0[i][j], the first neighbouring pixel value, in the first block reference_fore_0, of a neighbouring pixel position adjacent to the pixel position (i, j), the second pixel value in the second block reference_fore_1 is reference_fore_1[i][j], and the second neighbouring pixel value, in the second block reference_fore_1, of a neighbouring pixel position adjacent to the pixel position position (i, j). Then, the weight value weight_matrix[i][j] corresponding to the pixel position (i, j) in the current block may be determined according to the first pixel value reference_fore_0[i][j], the first neighbouring pixel value, the second pixel value reference_fore_1[i][j] and the second neighbouring pixel value, and after determining the weight value corresponding to each pixel position, a weight matrix weight_matrix of the current block may be generated according to the weight values corresponding to all the pixel positions.

It should be noted that in the embodiment of the present disclosure, the neighbouring pixel position adjacent to the pixel position (i, j) may include an upper pixel position (i−1, j), a lower pixel position (i+1, j), a left pixel position (i, j−1), and a right pixel position (i, j+1) of the pixel position (i, j).

For example, in the embodiment of the present disclosure, the determination of the weight value weight_matrix[i][j] corresponding to the pixel position (i, j) in the current block may be performed through the following formula:

$$\text{weight\_matrix}[i][j] = \text{clip3}\left(0, n, \left(\sum \text{reference\_fore\_0}[m][n] + \sum \text{reference\_fore\_1}[m][n]\right) / \left(\text{abs}\left(\sum \text{reference\_fore\_0}[m][n] - \sum \text{reference\_fore\_1}[m][n]\right) \times 8 + 1\right)\right) \quad (2)$$

Herein, (m, n) may include a pixel position (i, j) and neighbouring pixel positions (i−1, j), (i+1, j), (i, j−1), (i, j+1) around the pixel position.

It can be seen from the above formula (2) that a size of the weight value weight_matrix[i][j] is determined jointly by the pixel value reference_fore_0[m][n] in the first block and the pixel value reference_fore_1[m][n] in the second block. The closer the cumulative sum of the reference_fore_0[m][n] and the cumulative sum of the reference_fore_1[m][n] are, the greater the value of weight value weight_matrix[i][j] is, the greater the difference between the cumulative sum of the reference_fore_0[m][n] and the cumulative sum of the reference_fore_1[m][n] is, the smaller the value of the weight value weight_matrix[i][j] is.

It should be noted that in the embodiment of the present disclosure, for each pixel position, the corresponding weight value may be derived from the pixel values of multiple pixel positions. The multiple pixel positions are not only limited to the pixel position and neighbouring pixel positions around the pixel position, but may also include the pixel position and any other multiple pixel positions, so that the influence of noises may be reduced.

Further, in the embodiment of the present disclosure, when determining the weight value according to the at least one first reference block, for a pixel position, it is possible to select to adjust the weight value corresponding to the pixel position by using weight value corresponding to at least one other pixel position.

That is to say, in the embodiment of the present disclosure, after the generation of the weight matrix (weight values) of the current block is completed, the weight matrix weight_matrix of the current block may also be adjusted. For example, for each pixel position (i, j), the weight value weight_matrix[i][j] corresponding to the pixel position may be adjusted based on multiple weight values corresponding to multiple positions, so that noises may be further removed, which enable a transition region to be smoother.

Further, in the embodiment of the present disclosure, after determining the weight value according to the at least one first reference block, an inter prediction may be further performed on the current block based on the weight value, the at least one first reference block and the at least one second reference block, so that the prediction value of the current block may be determined.

It should be understood that in the embodiment of the present disclosure, when determining the prediction value of the current block, the pixel value of each pixel position may be predicted based on the weight value corresponding to each pixel position in the weight values and the pixel value of each pixel position in the at least one first reference block and the at least one second reference block, and finally the inter prediction for the current block may be completed to obtain the corresponding prediction value.

Optionally, in the embodiment of the present disclosure, when determining the prediction value of the current block based on the weight value, the at least one first reference block and the at least one second reference block, for a pixel position, the weight value corresponding to the pixel position may be determined based on the weight value of the current block, the at least one first pixel value corresponding to the pixel position may be determined based on the at least one first reference block, and the at least one second pixel value corresponding to the pixel position may be determined based on the at least one second reference block. Then, according to the weight value corresponding to the pixel position, the at least one first pixel value and the at least one second pixel value are weighted summed to determine a prediction pixel value corresponding to the pixel position. Finally, after traversing all pixel positions and determining all prediction pixel values corresponding to all the pixel positions, the prediction value of the current block may be determined according to all the prediction pixel values.

Optionally, in the embodiment of the present disclosure, assuming that the at least one first reference block includes two different reference blocks, which are respectively a first block and a second block, for a pixel position, the weight value corresponding to the pixel position is determined, a third pixel value corresponding to the pixel position is determined based on the first block, a fourth pixel value corresponding to the pixel position is determined based on the second block, and at least one pixel value corresponding to the pixel position is determined based on the at least one second reference block. Then, a prediction pixel value corresponding to the pixel position is determined, by weighted summing the third pixel value and/or the fourth pixel value and the at least one pixel value according to the weight value corresponding to the pixel position.

Optionally, in the embodiment of the present disclosure, assuming that the at least one first reference block includes two different reference blocks, which are respectively a first block and a second block, and one second reference block is determined simultaneously, then for a pixel position, the weight value corresponding to the pixel position is determined, a third pixel value corresponding to the pixel position is determined based on the first block, a fourth pixel value corresponding to the pixel position is determined based on the second block, and a fifth pixel value corresponding to the pixel position is determined based on one second reference block. Then, a prediction pixel value corresponding to the pixel position is determined, by weighted summing the third pixel value and/or the fourth pixel value and the fifth pixel value according to the weight value corresponding to the pixel position.

It should be noted that in the embodiment of the present disclosure, the maximum value of any one of the weight values (weight matrix) of the current block is n, and the minimum value is 0. If a value of the weight value weight_matrix[i][j] corresponding to the pixel position (i, j) is equal to n, then it may be considered that the prediction pixel value of the pixel position is determined based on the pixel value reference_fore [i][j] of the pixel position in the at least one first reference block. If the value of the weight value weight_matrix[i][j] corresponding to the pixel position (i, j) is equal to 0, then it may be considered that the prediction pixel value of the pixel position is determined based on the pixel value reference_back [i][j] of the pixel position in the at least one second reference block. If the value of the weight value weight_matrix[i][j] corresponding to the pixel position (i, j) is greater than 0 and less than n, then it may be considered that the prediction pixel value of the pixel position is determined jointly based on the pixel value reference_back [i][j] of the pixel position in the at least one second reference block and the pixel value reference_fore [i][j] of the pixel position in the at least one first reference block.

For example, in the embodiment of the present disclosure, assuming that the at least one first reference block includes two different reference blocks, which are respectively a first block reference_fore_0 and a second block reference_fore_1, and one second reference block reference_back is determined, a prediction pixel value Prediction[i][j] corresponding to the pixel position (i, j) in the current block may be determined through the following formula:

$$\text{Prediction}[i][j] = \quad (3)$$
$$(\text{reference\_fore\_0}[i][j] + \text{reference\_fore\_1}[i][j]) \times \text{weight\_matrix}[i][j] +$$
$$2 \times \text{reference\_back}[i][j] \times (n - \text{weight\_matrix}[i][j] + n))/(2 \times n)$$

When determining the prediction pixel value Prediction[i][j] corresponding to the pixel position (i, j), a 1-to-1 weighted operation is performed on the reference_fore_0[i][j] and the reference_fore_1[i][j].

For example, in the embodiment of the present disclosure, the prediction pixel value Prediction[i][j] corresponding to the pixel position (i, j) in the current block may be determined through the following formula:

$$\text{Prediction}[i][j] = (\text{reference\_fore\_0}[i][j] \times \text{weight\_matrix}[i][j] + \quad (4)$$
$$2 \times \text{reference\_back}[i][j] \times (n - \text{weight\_matrix}[i][j] + n))/(2 \times n)$$

When determining the prediction pixel value Prediction[i][j] corresponding to the pixel position (i, j), only the reference_fore_0[i][j] is referred to and the reference_fore_1[i][j] is not referred to.

For example, in the embodiment of the present disclosure, the prediction pixel value Prediction[i][j] corresponding to the pixel position (i, j) in the current block may be determined through the following formula:

$$\text{Prediction}[i][j] = (\text{reference\_fore\_1}[i][j] \times \text{weight\_matrix}[i][j] + \quad (5)$$
$$2 \times \text{reference\_back}[i][j] \times (n - \text{weight\_matrix}[i][j] + n))/(2 \times n)$$

When determining the prediction pixel value Prediction[i][j] corresponding to the pixel position (i, j), only the reference_fore_1[i][j] is referred to and the reference_fore_0[i][j] is not referred to.

Further, in the embodiment of the present disclosure, after all prediction pixel values corresponding to all pixel positions are determined based on the prediction method of the prediction pixel values of the above pixel positions, a prediction block of the current block may be generated according to all the prediction pixel values.

It should be understood that in the embodiment of the present disclosure, two first reference blocks may be used to determine the adaptive partitioning, and simultaneously the two first reference blocks are used to determine the prediction value of the foreground portion. Accordingly, two or more first reference blocks may be used to determine the adaptive partitioning and simultaneously the two or more first reference blocks are used to determine the prediction value of the foreground portion.

That is to say, in the embodiment of the present disclosure, the at least one first reference block may also include at least two first reference blocks.

Accordingly, in the embodiment of the present disclosure, when determining the prediction value of the current block based on the weight value, the at least one first reference block and the at least one second reference block, it is possible to select to determine the weight value according to the at least two first reference blocks. Then, the prediction value of the current block is determined based on the weight value, the at least one second reference block, and at least one first reference block in the at least two first reference blocks.

That is to say, in the present disclosure, in order to be able to better reduce noises, and reduce the influence of factors such as fine deformation, in the APM, more first reference blocks may be used to determine the adaptive partitioning and the prediction value of the foreground portion. It may be achieved by averaging or weighted averaging the multiple first reference blocks, which is not specifically limited in the present disclosure.

Further, in the embodiment of the present disclosure, since noises can be better reduced and the influence of factors such as fine deformation can be reduced by using two or more reference blocks for averaging or weighted averaging, for the background portion, it is also possible to select to use two or more second reference blocks for averaging or weighted averaging to obtain the prediction value of the background portion.

That is to say, in the embodiment of the present disclosure, the at least one second reference block may also include at least two second reference blocks.

Accordingly, in the embodiment of the present disclosure, when determining the prediction value of the current block based on the weight value, the at least one first reference block and the at least one second reference block, it is possible to select to determine the prediction value of the current block based on the weight value, at least one first reference block in the at least two first reference blocks and at least one second reference block in the at least one second reference block.

For example, in the present disclosure, the use of two first reference blocks and two second reference blocks is taken as an example for illustration. The at least one first reference block includes a first block and a second block, and the at least one second reference block includes a third block and a fourth block, i.e., in the APM, two first reference blocks containing foreground contents in the current block are the first block reference_fore_0 and the second block reference_fore_1, and two second reference blocks containing background contents in the current block are the third block reference_back_0 and the fourth block reference_back_1. The weight matrix weight_matrix may be generated according to the reference_fore_0 and the reference_fore_1.

Optionally, in the embodiment of the present disclosure, assuming that the at least one first reference block includes two different reference blocks, which are respectively a first block and a second block, and the at least one second reference block includes two different reference blocks, which are respectively a third block and a fourth block, when determining a prediction value of the current block based on the weight value, the at least one first reference block and the at least one second reference block, for a pixel position, a weight value corresponding to the pixel position may be determined, a third pixel value corresponding to the pixel position may be determined based on the first block, a fourth pixel value corresponding to the pixel position may be determined based on the second block, a sixth pixel value corresponding to the pixel position may be determined based on the third block, and a seventh pixel value corresponding to the pixel position may be determined based on the fourth block. Then, a prediction pixel value corresponding to the pixel position may be determined by weighted summing the third pixel value and/or the fourth pixel value, the sixth pixel value and the seventh pixel value according to the weight value corresponding to the pixel position.

It should be noted that in the embodiment of the present disclosure, the maximum value of any one of the weight values in the weight matrix is n, and the minimum value is 0. If the weight value weight_matrix[i][j] corresponding to the pixel position (i, j) is equal to n, it may be considered that the prediction pixel value of the pixel position is determined based on the pixel value reference_fore_0[i][j] of the pixel position in the first block and/or the pixel value reference_fore_1[i][j] of the pixel position in the second block. If the weight value weight_matrix[i][j] corresponding to the pixel position (i, j) is equal to 0, it may be considered that the prediction pixel value of the pixel position is determined based on the pixel value reference_back_0[i][j] of the pixel position in the third block and the pixel value reference_back_1[i][j] of the pixel position in the fourth block. If the weight value weight_matrix[i][j] corresponding to the pixel position (i, j) is greater than 0 and less than n, it may be considered that the prediction pixel value of the pixel position is determined based on the pixel value reference_fore_0[i][j] of the pixel position in the first block and/or the pixel value reference_fore_1[i][j] of the pixel position in the second block, and the pixel value reference_back_0[i][j] of the pixel position in the third block and the pixel value reference_back_1[i][j] of the pixel position in the fourth block.

For example, in the embodiment of the present disclosure, the prediction pixel value Prediction[i][j] corresponding to the pixel position (i, j) in the current block may be determined through the following formula:

$$\begin{aligned}\text{Prediction}[i][j] = &((\text{reference\_fore\_0}[i][j] + \\ &\text{reference\_fore\_1}[i][j]) \times \text{weight\_matrix}[i][j] + \\ &(\text{reference\_back\_0}[i][j] + \text{reference\_back\_1}[i][j]) \times \\ &(n - \text{weight\_matrix}[i][j] + n))/(2 \times n)\end{aligned} \quad (7)$$

When determining the prediction pixel value Prediction[i][j] corresponding to the pixel position (i, j), a 1-to-1 weighted operation is performed on the reference_fore_0[i][j] and the reference_fore_1[i][j], and a 1-to-1 weighted operation is performed on the reference_back_0[i][j] and the reference_back_1[i][j] at the same time.

For example, in the embodiment of the present disclosure, the prediction pixel value Prediction[i][j] corresponding to the pixel position (i, j) in the current block may be determined through the following formula:

$$\begin{aligned}\text{Prediction}[i][j] = &(\text{reference\_fore\_0}[i][j] \times \text{weight\_matrix}[i][j] + \\ &\text{reference\_back\_1}[i][j] \times (n - \text{weight\_matrix}[i][j] + n))/(2 \times n)\end{aligned} \quad (8)$$

When determining the prediction pixel value Prediction[i][j] corresponding to the pixel position (i, j), only the reference_fore_0[i][j] is referred to and the reference_fore_1[i][j] is not referred to, and at the same time only the reference_back_1[i][j] is referred to and the reference_back_0[i][j] is not referred to.

For example, in the embodiment of the present disclosure, the prediction pixel value Prediction[i][j] corresponding to the pixel position (i, j) in the current block may be determined through the following formula:

$$\begin{aligned}\text{Prediction}[i][j] = &(\text{reference\_fore\_1}[i][j] \times \text{weight\_matrix}[i][j] + \\ &\text{reference\_back\_0}[i][j] \times (n - \text{weight\_matrix}[i][j] + n))/(2 \times n)\end{aligned} \quad (9)$$

When determining the prediction pixel value Prediction[i][j] corresponding to the pixel position (i, j), only the reference_fore_1[i][j] is referred to and the reference_fore_0[i][j] is not referred to, and at the same time only the reference_back_0[i][j] is referred to and the reference_back_1[i][j] is not referred to.

Further, in the embodiment of the present disclosure, after all prediction pixel values corresponding to all pixel positions are determined based on the prediction method of the prediction pixel values of the above pixel positions, a prediction block of the current block may be generated according to all the prediction pixel values.

Specifically, in the present disclosure, if the APM is used for the current block and four reference blocks are required for the inter prediction, where the four reference blocks are respectively two first reference blocks, i.e., the first block reference_fore_0 and the second block reference_fore_1, and two second reference blocks, i.e., the third block reference_back_0 and the fourth block reference_back_1. Four pieces of motion information may be determined at first, and these four pieces of motion information may be obtained according to information obtained by parsing the bitstream, information of neighbouring blocks of the current block, or a motion information list, so that four reference blocks may be further determined according to the four pieces of motion information. The four reference blocks may be integer-pixel reference blocks directly intercepted from the reference picture, or may be reference blocks obtained by performing the fractional-pixel interpolation on the integer-pixel reference picture based on the motion information, or may be reference blocks obtained by performing the affine prediction on the original reference picture based on the motion information, or may be reference blocks obtained by using other processing methods, which are not specifically limited in the present disclosure.

Figure 8:
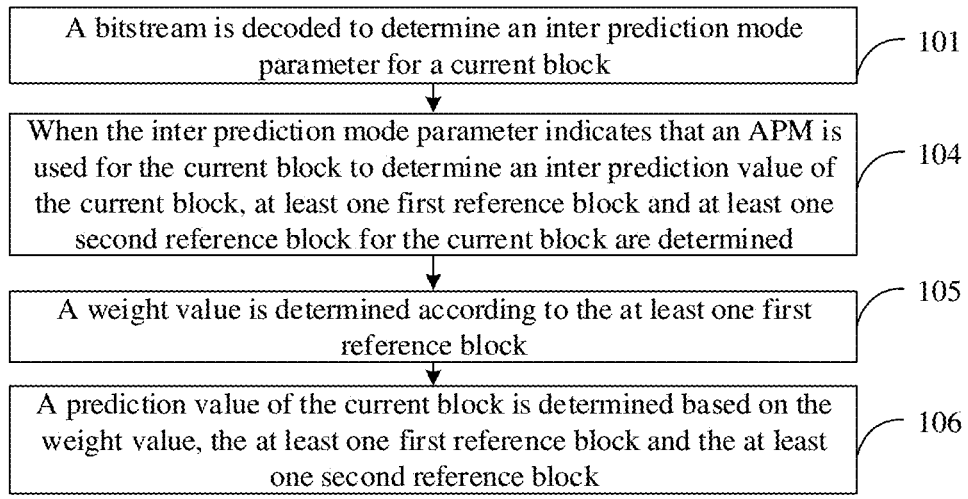
FIG. 8 is a second schematic flowchart of implementation of a method for inter prediction.

Further, in the embodiment of the present disclosure, the inter prediction method applied to the decoder is proposed through the above operations 101 to 103. FIG. 8 is a second schematic flowchart of implementation of a method for inter prediction. As shown in FIG. 8, the method for inter prediction performed by the decoder may further include the following operations.

At operation 101, a bitstream is decoded to determine an inter prediction mode parameter for a current block.

At operation 104, when the inter prediction mode parameter indicates that an APM is used for the current block to determine an inter prediction value of the current block, at least one first reference block and at least one second reference block for the current block are determined.

At operation 105, a weight value is determined according to the at least one first reference block.

At operation 106, a prediction value of the current block is determined based on the weight value, the at least one first reference block and the at least one second reference block.

To sum up, through the method for inter prediction proposed in the above operation 101 to operation 106, after determining that the APM is used for the current block, at least one reference block containing foreground contents in the current block, i.e., the at least one first reference block reference_fore, and at least one reference block containing background contents in the current block, i.e., the at least one second reference block reference_back, can be determined simultaneously. Then, the weight value can be generated according to the at least one first reference block reference_fore, and finally the prediction value of the current block can be determined based on the weight value in combination with the at least one first reference block and the at least one second reference block.

It should be noted that the inter prediction method proposed in the present disclosure is a prediction method based on an APM. Since the APM can realize an irregular partitioning of the current block, it can be considered that the APM (partitioning simulated by the APM) is finer than a GPM, thereby obtaining a better prediction effect.

In the inter prediction method provided by the embodiment of the present disclosure, a decoder decodes a bitstream to determine an inter prediction mode parameter for a current block; when the inter prediction mode parameter indicates that an APM is used for the current block to determine an inter prediction value of the current block, determines at least one first reference block and at least one second reference block for the current block, where the APM is used for partitioning of arbitrary shapes based on picture contents; and determines a prediction value of the current block according to the at least one first reference block and the at least one second reference block. That is to say, in the embodiment of the present disclosure, based on the APM, a codec can obtain the at least one first reference block and the at least one second reference block, then implement the partitioning of arbitrary shapes through the at least one first reference block, and finally can predict the current block in combination with the at least one first reference block and the at least one second reference block, so that an inter prediction in which the video contents are adaptively partitioned is implemented, which can reduce the complexity on the basis of improving the accuracy of the inter prediction, and realize a simple and efficient encoding and decoding method, thereby improving the compression performance.

Based on the above embodiments, the inter prediction method proposed in the present disclosure may be an adaptive partitioning mode according to the video contents. In the present disclosure, partitioning is a generalized partitioning, which may refer to a substantial partitioning of a coding unit or a prediction unit, or may also refer to a simulated partitioning in which a weighted combination may be performed by using the weight value or other ways in the same coding unit or prediction unit.

It should be noted that in the embodiment of the present disclosure, when performing an adaptive partitioning according to video contents, the adaptive partitioning may be performed according to the reconstructed region around the current block, the reference picture or the reference block. Arbitrary shapes determined based on the video contents may be partitioned by the adaptive partitioning method according to the video contents. That is, the shape obtained by the adaptive partitioning may be any shape which is not limited by a straight line and a curve obtained by a geometric calculation.

Specifically, the embodiment of the present disclosure provides an adaptive partitioning method according to contents in the reference picture. Because of the correlation between pictures in the video, it is assumed that an object in the current picture also exists in the reference picture, and because the time interval between the reference picture and the current picture is short, the object does not appear obvious deformations and changes in brightness and chroma between the two pictures. The current picture may be partitioned according to the edges of the object in the reference picture.

Figure 9:
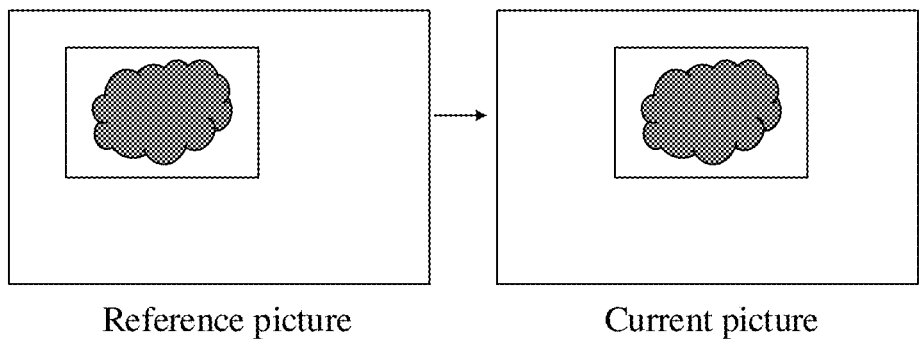
FIG. 9 is a first schematic diagram of partitioning.
Figure 10:
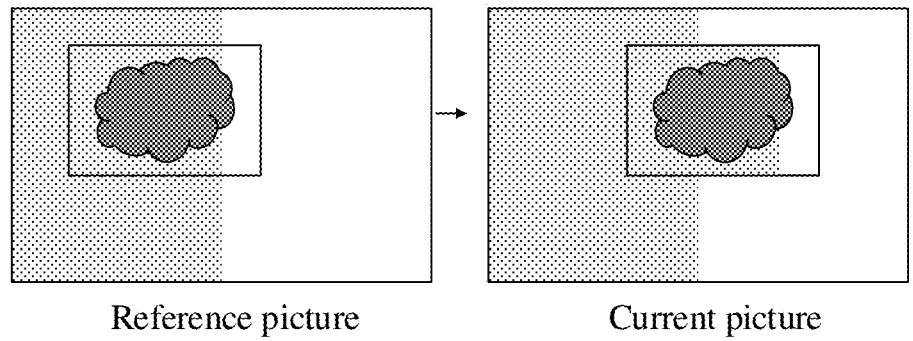
FIG. 10 is a second schematic diagram of partitioning.

It should be noted that a simple model is that an object performs a translational motion on a background. FIG. 9 is a first schematic diagram of partitioning. As shown in FIG. 9, if the background is particularly simple, such as a solid color, it can be well processed by the conventional partitioning of a rectangular block, and this is because even though the background in a reference block and the background of a current picture are not at a same position, the values are the same. FIG. 10 is a second schematic diagram of partitioning. As shown in FIG. 10, if the background is not a simple solid color, the conventional partitioning of a rectangular block will bring in certain background information or miss certain object information because it cannot be close to the edges of the object. If it is expected to be close to the edge of the cloud as shown in FIG. 10 using GPM, multiple numbers of partitioning are needed to complete it.

Figure 11:
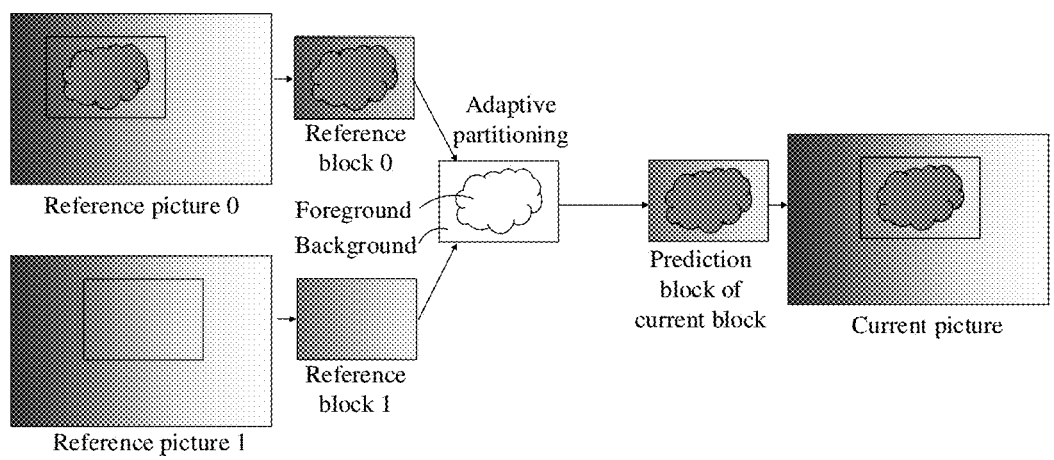
FIG. 11 is a third schematic diagram of partitioning.

Further, in the embodiment of the present disclosure, FIG. 11 is a third schematic diagram of partitioning. As shown in FIG. 11, in the embodiment of the present disclosure, it may select to combine two reference blocks into a prediction block of the current block using the irregular partitioning. Specifically, according to a matching algorithm, a reference block 0 is determined through a reference picture 0, a reference block 1 is determined through a reference picture 1, an adaptive partitioning is generated according to the reference block 0 and/or the reference block 1, and the two reference blocks are combined into the prediction block of the current block using the adaptive partitioning. The foreground of the adaptive partitioning uses the contents of the reference block 0, and the background of the adaptive partitioning uses the contents of the reference block 1, so that the effect of corresponding positions in the current picture may be combined.

It should be noted that in the embodiment of the present disclosure, the key of APM lies in how to generate an irregular partitioning. In order to achieve the irregular partitioning, one method is to use a detection or partitioning algorithm to detect a reference block containing a foreground object (such as the reference block 0 in FIG. 11), to obtain contours of the foreground object, and uses the contours as partitioning lines for the adaptive partitioning. For some simple scenes, it is not difficult to detect the contours of the foreground objects directly. However, in many cases, foreground objects and background objects in natural videos are not intuitively partitioned, that is to say, complex detection algorithms need to be used to obtain appropriate partitions, such as some commonly used detection or partitioning algorithms based on the deep learning or the neural network, but these methods have high complexity and are only suitable for scenes without strict requirements on complexity.

Further, in the embodiment of the present disclosure, a simpler method of generating irregular partitioning may be employed. Specifically, the irregular partitioning may be determined according to two reference blocks containing foreground objects. The reference block containing the foreground objects refers to contents that contain the foreground objects or a part of the foreground objects contained in the current block. The current block may contain only a part of the foreground objects, so the reference block only needs to contain this part of the foreground object. In the field of video encoding and decoding, the containing the foreground objects should be understood as containing contents approximately matching the foreground objects.

It is assumed that the foreground objects do not changes in brightness, color or shape during a motion, and no distortion occurs in the reference picture does not distort. Then in two reference blocks containing foreground objects, if the positions of the foreground objects are aligned, it may be considered that the foreground objects can be completely matched. It is assumed that the relative position of foreground objects and background objects does change, or otherwise, a better prediction may be obtained by directly using the rectangular partitioning. Assuming that the brightness, color and texture of background objects are different in different positions, the background objects of two reference blocks are misplaced in a case that the foreground objects are aligned, and thus the background objects are not matched. In this way, the edges between the foreground objects and the background objects may be distinguished.

The model constructed based on the above assumption is an ideal situation. It may not be so ideal in most cases where natural videos or videos are shot by a camera. However, such a situation is not inevitable. For example, in coding of a screen content, the screen content is generated by a computer. In many scenes, it is possible to achieve that the foreground objects do not change in brightness, color or shape during a motion. Then for the natural videos or the videos shot by the camera, due to the influence of noises, the pixel value of an object at the same position in different pictures may change slightly. The object may undergo subtle deformations between different pictures. As a result, it is difficult to completely match the foreground objects in the natural videos or the videos shot by the camera. Therefore, when matching the foreground objects in the natural videos, a certain tolerance should be set. That is, they may be considered as the same object as long as the similarity is high enough.

On the other hand, the edges of the objects in the video of the screen content may be very sharp, for example, the edges of a letter, the edges between black color and white color may be very clear. In natural videos or shot videos, the edges between objects are not very sharp. Due to acquisition by a camera, the edges of an object usually have some pixels for transition. Therefore, the edge region irregularly partitioned in the natural videos should not be a clear boundary, but may be a transition region. For example, reference may be made to the weight matrix of the GPM in the VVC. The difference is that the weight matrix of the GPM is a weight matrix of a simulated partitioning with a transition region of straight line generated according to some parameters. Accordingly, in the present disclosure, the weight matrix of the simulated partition with the transition region of irregular shapes needs to be generated, thereby implementing the application of the Adaptive partitioning Mode.

Figure 12:
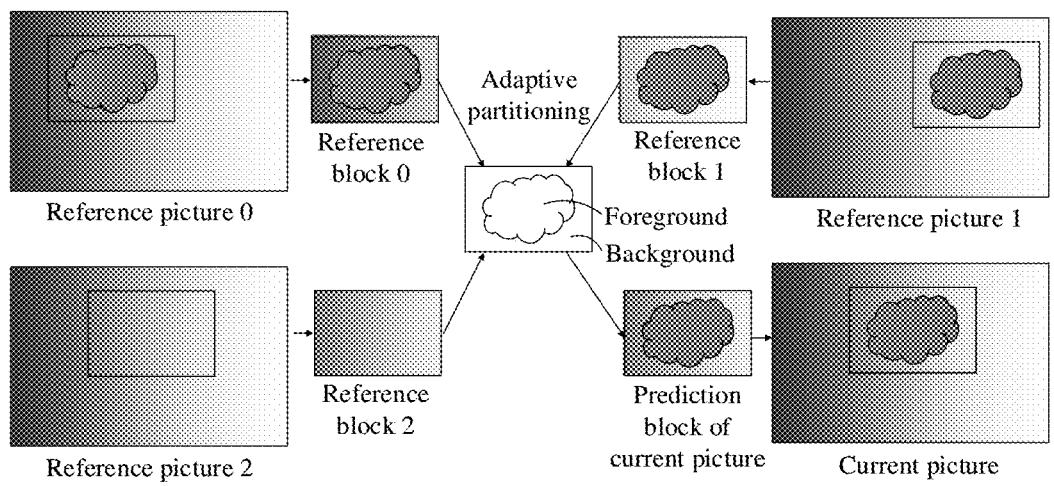
FIG. 12 is a first schematic diagram of implementation of an inter prediction.

Specifically, in the embodiment of the present disclosure, FIG. 12 is a first schematic diagram of implementation of an inter prediction. As shown in FIG. 12, a reference block 0 may be determined through a reference picture 0, a reference block 1 may be determined through a reference picture 1, a reference block 2 may be determined through a reference picture 2, and an adaptive partitioning may be generated according to the reference block 0 and/or the reference block 1. After an irregular partitioning is determined, a prediction value of a foreground portion may be determined according to the reference block 0 and/or the reference block 1, and a prediction value of a background portion may be determined according to the reference block 2, thereby obtaining a prediction value of the current block.

Figure 13:
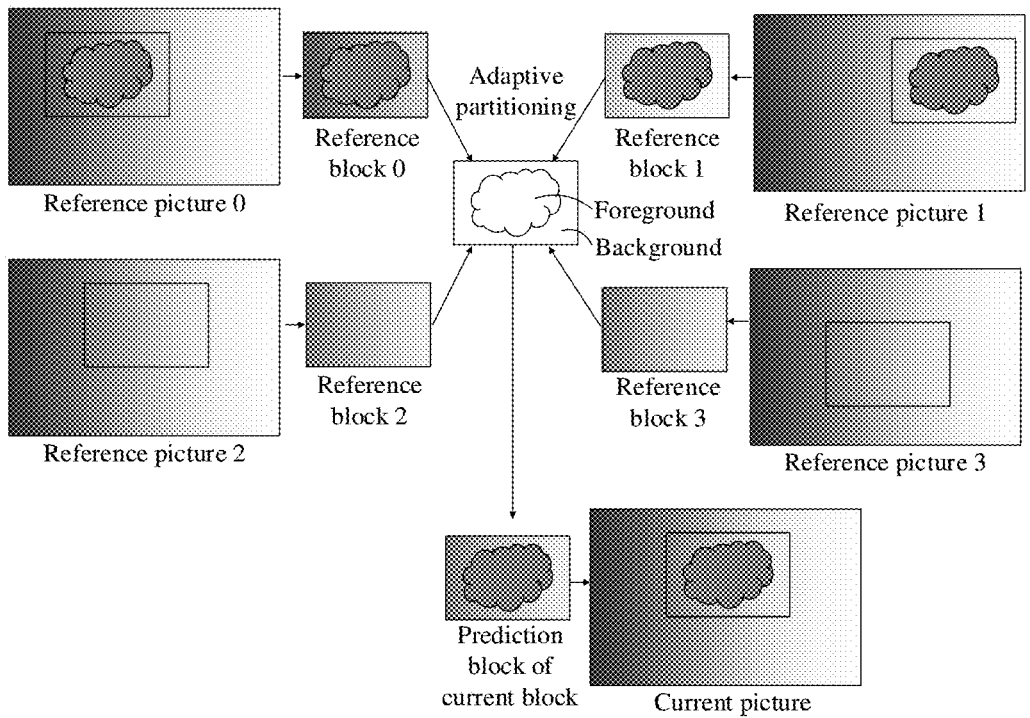
FIG. 13 is a second schematic diagram of implementation of an inter prediction.

Specifically, in the embodiment of the present disclosure, FIG. 13 is a second schematic diagram of implementation of an inter prediction. As shown in FIG. 13, a reference block 0 may be determined through a reference picture 0, a reference block 1 may be determined through a reference picture 1, a reference block 2 may be determined through a reference picture 2, a reference block 3 may be determined through a reference picture 3, and an adaptive partitioning may be generated according to the reference block 0 and/or the reference block 1. After an irregular partitioning is determined, a prediction value of a foreground portion may be determined according to the reference block 0 and/or the reference block 1, and a prediction value of a background portion may be determined according to the reference block 2 and/or the reference block 3, thereby obtaining a prediction value of the current block.

That is to say, in the present disclosure, based on the APM, the weight value may be generated according to the at least one reference block containing foreground contents in the current block. A prediction block of the current block is generated according to at least one of the at least one reference block containing foreground contents in the current block or the at least one of the at least one reference block containing background contents in the current block in combination with the weight value. A reference block containing foreground contents in the current block should be understood as a reference block containing a best match of the foreground contents in the current block or a reference block containing a match of the foreground contents in the current block, and a reference block containing background contents in the current block should be understood as a reference block containing a best match of the background contents in the current block or a reference block containing a match of the background contents in the current block.

It should be noted that in the embodiment of the present disclosure, the sizes of the reference block and the current block may be considered to be the same in order to simplify the codec processing. However, it is not necessary to obtain a complete reference block. For example, one of the at least one reference block containing foreground contents only needs to contain content enough to determine the weight value of the adaptive partitioning, and one of the at least one reference block containing background contents only needs to contain enough background contents. Particularly for the reference block containing background contents, only the desired part needs to be determined according to the weight value.

The embodiment of the present disclosure provides an inter prediction method, based on APM, a codec may obtain at least one first reference block and at least one second reference block, then perform the partitioning of arbitrary shapes through the at least one first reference block, and finally perform prediction on a current block in combination with the at least one first reference block and the at least one second reference block, so that an inter prediction in which the video contents are adaptively partitioned is implemented, which can reduce the complexity on the basis of improving the accuracy of the inter prediction, and realize a simple and efficient encoding and decoding method, thereby improving the compression performance.

Figure 14:
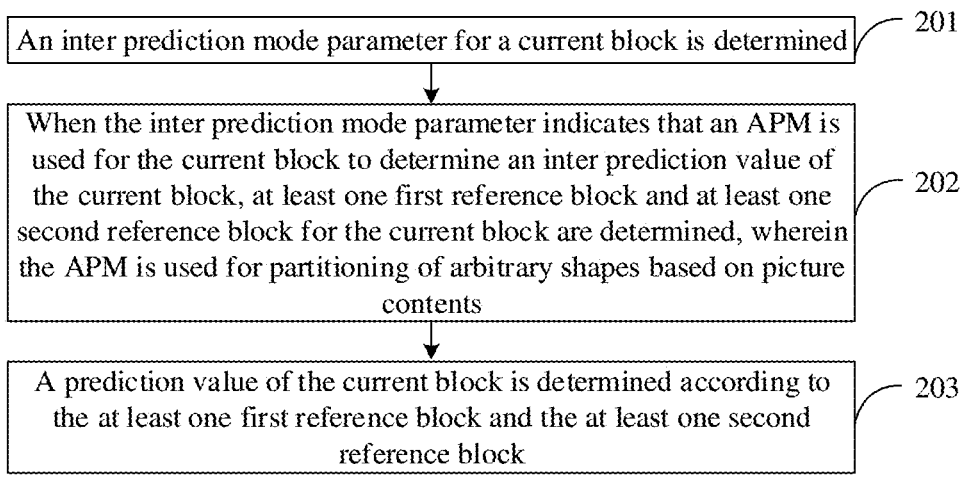
FIG. 14 is a third schematic flowchart of implementation of a method for inter prediction.

Another embodiment of the present disclosure provides an inter prediction method, which is applied to an encoder. FIG. 14 is a third flow schematic diagram of implementation of an inter prediction method. As shown in FIG. 14, the inter prediction method performed by the encoder may include the following operations.

At operation 201, an inter prediction mode parameter for a current block is determined.

In an embodiment of the present disclosure, the encoder may determine the inter prediction mode parameter for the current block.

It should be noted that in embodiments of the present disclosure, the inter prediction mode parameter may indicate that whether an APM can be used for the current block, that is, indicating that whether two different reference blocks can be used for the current block to irregularly partition the current block.

It should be understood that in the embodiment of the present disclosure, the inter prediction mode parameter may be understood as a flag bit indicating whether the APM is used. Specifically, the encoder may determine a variable that is used as the inter prediction mode parameter, so that the determination of the inter prediction mode parameter may be realized by the value of the variable.

It should be noted that in the embodiment of the present disclosure, the APM is an inter prediction method. Specifically, in the APM, at least one first reference block and at least one second reference block are determined for a current block, then a weight value may be determined, the at least one first reference block and the at least one second reference block are combined according to the weight value, and finally a new prediction block may be obtained, that is, the prediction block of the current block may be obtained. The first reference block may be used as a foreground reference block and the second reference block may be used as a background reference block.

Furthermore, in the embodiment of the present disclosure, the APM may be used for partitioning of arbitrary shapes based on picture contents, that is, the inter prediction method proposed in the present disclosure may be an adaptive partitioning mode according to the video contents. In the present disclosure, the partitioning is a generalized partitioning, which may refer to an actual partitioning of a coding unit or a prediction unit, or may also refer to a simulated partitioning in which a weighted combination may be performed by using the weight value or other ways in the same coding unit or prediction unit.

That is to say, in the embodiment of the present disclosure, the partitioning of arbitrary shapes realized based on the APM may be an actual partitioning or a simulated partitioning.

It should be noted that in the embodiment of the present disclosure, a video picture may be partitioned into multiple picture blocks, and the current block is each current picture block to be encoded, which can be referred to as a CB. Here, each CB may include a first picture component, a second picture component and a third picture component. Specifically, in the present disclosure, assuming that the first picture component is predicted and the first picture component is a luma component, i.e., a picture component to be predicted is a luminance component, an encoded block to be predicted may be referred to as a luminance block. Alternatively, assuming that the second picture component is predicted and the second picture component is a chroma component, i.e., the picture component to be predicted is a chroma component, the encoded block to be predicted may be referred to as a chroma block.

For example, in the present disclosure, there may be a picture-level flag to determine whether the APM is used for a current picture to be decoded. For example, it may be configured that the APM is used for intra pictures (such as I pictures), and the APM is not used for inter pictures (such as B pictures, P pictures). Alternatively, it may be configured that the APM is not used for intra pictures, and the APM is used for inter pictures. Alternatively, it may be configured that the APM is used for some intra pictures and the APM is not used for some intra pictures.

For example, in the present disclosure, there may be a block-level flag to determine whether the APM is used for the block. For example, there may be a CU-level flag or a PU-level flag to determine whether the APM is used for the block. Further, there may be one or more flags of a sequence level, a picture level or below a picture level and above a CU level (such as a tile level, a slice level, a patch level, a LCU level, a CTU level, etc.) to determine whether the AMP is possible or allowed for this region, and if this or these flags indicate that the AMP is possible or allowed for the current region, then whether the APM is used for this block is determined according to the CU-level flag or PU-level flag.

It should be noted that in the embodiment of the present disclosure, the inter prediction mode parameter indicates the inter prediction mode adopted by the current block and parameters related to the inter prediction mode. Here, with respect to the determination of the inter prediction mode parameter, a simple decision strategy may be adopted, for example, the inter prediction mode parameter is determined according to a size of a distortion value. A complex decision strategy may also be employed, for example, the inter prediction mode parameter is determined according to a result of a Rate Distortion Optimization (RDO), which are not limited in the embodiments of the present disclosure. Generally speaking, the RDO mode may be used to determine the inter prediction mode parameter for the current block.

Specifically, in some embodiments, when determining the inter prediction mode parameter for the current block, the encoder may first pre-code the current block by using multiple prediction modes to obtain a rate distortion cost value corresponding to each prediction mode. Then, a minimum rate distortion cost value is selected from the obtained multiple rate distortion cost values, and the inter prediction mode parameter for the current block is determined according to a prediction mode corresponding to the minimum rate distortion cost value.

That is to say, at the encoder side, the current block may be pre-coded respectively by adopting multiple prediction modes for the current block. Here, the multiple prediction modes usually include an ordinary inter prediction mode, a GPM and a translation prediction, etc.

In this way, after the current block is pre-coded by using multiple prediction modes respectively, the rate distortion cost value corresponding to each prediction mode may be obtained. Then, a minimum rate distortion cost value is selected from the obtained multiple rate distortion cost values, and the prediction mode corresponding to the minimum rate distortion cost value is determined as the inter prediction mode of the current block. In addition, a distortion value corresponding to each prediction mode may be obtained after the current block is pre-coded by using multiple prediction modes respectively. Then, a minimum distortion value is selected from the obtained multiple distortion values, and a prediction mode corresponding to the minimum distortion value is determined as the inter prediction mode used by the current block, and a corresponding inter prediction mode parameter is set according to the inter prediction mode. In this way, the current block is finally encoded using the determined inter prediction mode, and in this prediction mode, the prediction residual may be smaller, and thus the coding efficiency may be improved.

That is to say, at encoder, the encoder may select an optimal prediction mode to pre-code the current block, and in this process, an inter prediction mode of the current block may be determined, and then an inter prediction mode parameter for indicating the inter prediction mode may be determined, so that the corresponding inter prediction mode parameter is signalled into a bitstream and transmitted by the encoder to the decoder.

Accordingly, at decoder, the decoder may directly obtain the inter prediction mode parameter for the current block by phasing the bitstream, and determine an inter prediction mode used by the current block and related parameters corresponding to the inter prediction mode according to the inter prediction mode parameter obtained by parsing.

At operation 202, when the inter prediction mode parameter indicates that an APM is used for the current block to determine an inter prediction value of the current block, at least one first reference block and at least one second reference block for the current block are determined. The APM is used for partitioning of arbitrary shapes based on picture contents.

In an embodiment of the present disclosure, after the inter prediction mode parameter for the current block is determined, the at least one first reference block and the at least one second reference block for the current block may be further determined if the inter prediction mode parameter indicates that the APM is used for the current block to determine the inter prediction value of the current block.

It should be noted that in the embodiment of the present disclosure, if it is determined to use the APM, determination of reference blocks is needed at first. Specifically, one or more foreground reference blocks, i.e., at least one first reference block, of the current block may be determined, and one or more background reference blocks, i.e., at least one second reference block, of the current block need to be determined at the same time.

It should be understood that in the embodiment of the present disclosure, the at least one first reference block may be used for predicting the foreground contents of the current block, and the at least one second reference block may be used for predicting the background contents of the current block. Thus, in the present disclosure, the first reference block may be represented as the foreground reference block and the second reference block may be represented as the background reference block.

Furthermore, in the embodiment of the present disclosure, the determination of different first reference blocks may be performed based on at least one different reference picture, i.e., the at least one first reference block is respectively from different reference pictures. Accordingly, in the present disclosure, the determination of the at least one second reference block may be performed based on at least one different reference picture, i.e., the at least one second reference block is respectively from different reference pictures. Any one of the at least one reference pictures used for determining the at least one second reference block may be different from or the same as any one of the at least one reference pictures used for determining the at least one first reference block.

That is to say, in the present disclosure, the at least one first reference block may be determined according to the at least one first reference picture, and the at least one second reference block may be determined according to the at least one second reference picture. The at least one first reference picture may be different from the at least one second reference picture. Alternatively, the at least one first reference picture is different from each other, the at least one second reference picture is also different from each other, and at least one picture of the at least one first reference picture is the same as at least one picture of the at least one second reference picture.

Figure 15:
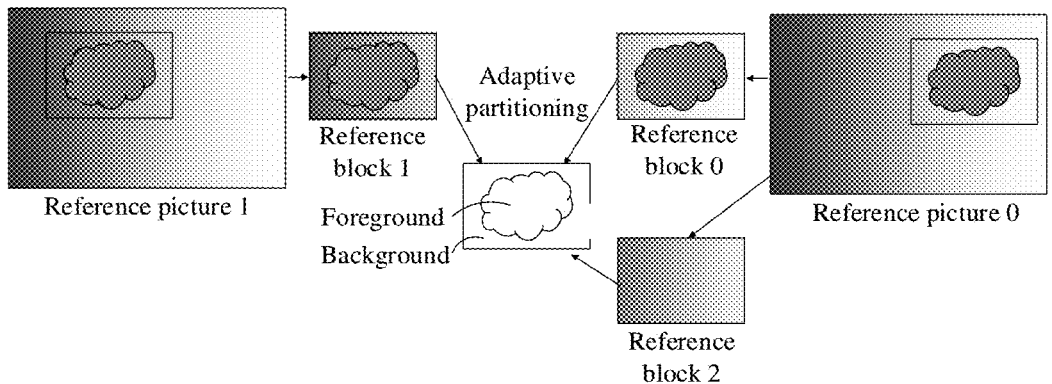
FIG. 15 is a fourth schematic diagram of obtaining a reference block.

For example, in an embodiment of the present disclosure, FIG. 15 is a fourth schematic diagram of obtaining a reference block. As shown in FIG. 15, a corresponding reference block 0 (a first reference block, i.e., a foreground reference block) and reference block 2 (a second reference block, i.e., a background reference block) may be obtained based on a reference picture 0 (a first reference picture and a second reference picture are same), and a corresponding reference block 1 (another first reference block, i.e., another foreground reference block) may be obtained based on a reference picture 1 (the second reference picture).

Furthermore, in the embodiment of the present disclosure, the current block, the at least one first reference block and the at least one second reference block are picture blocks with a same size.

It should be noted that in the present disclosure, in order to reduce the processing complexity of the codec, it can be considered that the size of each reference block is the same as the size of the current block. However, it is not required to obtain a complete reference block. For example, a reference block containing foreground contents only needs to contain contents that are enough to determine the weight value for the adaptive partitioning, and a reference block containing background contents only needs to contain enough background contents. Particularly for the reference block containing background contents, only the desired part needs to be determined according to the weight value.

It should be understood that in an embodiment of the present disclosure, the current block and the first reference block have entirely or partly same foreground contents, respectively, so that the foreground portion can be predicted using the at least one first reference block. The current block and the second reference block have entirely or partly same background contents, so that the background portion can be predicted using the at least one second reference block.

It should be noted that in the present disclosure, the foreground contents may be understood as foreground objects contained in the current block, and the background contents may be understood as background objects contained in the current block. In particular, the at least one first reference block may contain contents of the foreground objects or contents of a part of the foreground objects contained in the current block, and the current block may contain only a part of the foreground objects, so the at least one first reference block may also contain only this part of the foreground objects. The at least one second reference block may contain contents of the background objects or contents of a part of the background objects contained in the current block, and the current block may contain only a part of the background objects, so the at least one second reference block may also contain only this part of the foreground objects.

It should be understood that in the embodiments of the present disclosure, the at least one first reference block may be a reference block(s) containing foreground contents in the current block, which may be understood as a reference block(s) containing a best match of the foreground contents in the current block, or a reference block(s) containing a match of the foreground contents in the current block. The at least one second reference block may be a reference block(s) containing background contents in the current block, which may be understood as a reference block(s) containing a best match of the background contents in the current block, or a reference block(s) containing a match of the background contents in the current block.

Furthermore, in the embodiments of the present disclosure, the determination of the at least one first reference block and the at least one second reference block for the current block may be performed in multiple different manners, which are not specifically limited in the embodiments of the present disclosure.

Optionally, in the present disclosure, when determining the at least one first reference block and the at least one second reference block for the current block, the at least one first reference picture and the at least one second reference picture may be determined at first. Then, the at least one first reference block is determined directly according to the at least one first reference picture, and the at least one second reference block is determined according to the at least one second reference picture.

That is to say, in the present disclosure, it may be selected that the acquisition of the reference block is directly performed from the reference picture.

Optionally, in the present disclosure, when determining the at least one first reference block and the at least one second reference block for the current block, at least one piece of first motion information and at least one piece of second motion information may be determined at first. Then, the at least one first reference block and the at least one second reference block are determined based on the at least one piece of the first motion information and the at least one piece of the second motion information.

That is to say, in the present disclosure, it is possible to select to acquire the motion information at first and then acquire the reference block from the reference picture using the determined motion information. Specifically, in order to obtain multiple reference blocks, it is necessary to obtain multiple piece of motion information at first, one piece of motion information is used to obtain one reference block, and the multiple piece of motion information may be obtained using different methods, which are not specifically limited in the present disclosure.

It should be noted that in the embodiment of the present disclosure, the motion information may be a motion vector, that is, the first motion information and the second motion information may include a first motion vector and a second motion vector respectively.

Furthermore, in the embodiment of the present disclosure, when determining the at least one piece of first motion information and the at least one piece of second motion information, at least one piece of first initial motion information and at least one piece of second initial motion information may be determined at first. Then the at least one piece of first initial motion information and the at least one piece of second initial motion information may be refined, respectively, so as to obtain at least one piece of first motion information and at least one piece of second motion information.

It should be understood that in the present disclosure, the at least one piece of first initial motion information and the at least one piece of second initial motion information may include a first initial motion vector and a second initial motion vector respectively.

Specifically, in the embodiment of the present disclosure, the refining of the motion information may be performed through various methods, for example, the refining of the motion information may be performed through techniques, such as a DMVR or a DMVD. For the DMVR, when performing a bidirectional prediction, a motion vector MV0 and a motion vector MV1 are taken as initial MVs, more accurate MV0' and MV1' are searched for near the MV0 and the MV1 respectively, and then prediction blocks pointed by the MV0 and the MV1 are weighted to obtain a final prediction block.

Optionally, in the present disclosure, the at least one piece of the first initial motion information and the at least one piece of the second initial motion information may be refined by utilizing the DMVR. Alternatively, the at least one piece of the first initial motion information and the at least one piece of the second initial motion information may be refined by utilizing the DMVD. The motion information may be refined by utilizing other techniques, which are not specifically limited in the present disclosure.

That is to say, in the present disclosure, the APM may also be used in conjunction with the search method at decoding end. For example, after obtaining initial motion information, the DMVR, the motion information may be refined using the DMVD and other technologies at first. For example, for two reference blocks containing foreground contents, the DMVR is used to search in a small range for a better match, and a more accurate prediction block may be obtained in a case that the motion information is not accurate enough.

It should be understood that the bandwidth of a reference picture region for the inter prediction has an important influence on the hardware performance during the current hardware implementation. In traditional unidirectional prediction, one piece of motion information needs to be used to obtain one reference block from the reference picture, while in traditional bidirectional prediction, two piece of motion information need to be used to obtain two reference blocks from the reference picture. The worst case is that the bidirectional prediction requires a bandwidth about twice as that in the unidirectional prediction. The worst case of the requirement to the bandwidth in the sub-block-based prediction also increases compared with the block-based prediction, because obtaining different reference blocks in the sub-block-based prediction will use different motion information.

It should be noted that in the present disclosure, based on the APM, multiple reference blocks (at least one first reference block and at least one second reference block) need to be determined by using multiple pieces of motion information, which requires a larger bandwidth than the traditional bidirectional prediction. In order to reduce the bandwidth to a certain extent, any number of the second reference blocks reference_back containing background contents and any number of the first reference blocks reference_fore containing foreground contents may be limited to be provided on a same reference picture, and a distance between them is relatively close, because the foreground contents and the background contents of the current block and the foreground contents and the background contents on the reference picture are obtained by moving for a very short time (a few tenths of a second or less). Accordingly, in the present disclosure, without the aforementioned limitation, multiple pieces of motion information may correspond to multiple different reference pictures, i.e., multiple reference blocks are respectively from multiple different reference pictures.

Specifically, in the embodiment of the present disclosure, it may be limited that the reference picture(s) corresponding to the at least one piece of the second motion information is the same as the reference picture(s) corresponding to the at least one piece of the first motion information, and an absolute value of a vector difference between the at least one piece of the second motion information and the at least one piece of the first motion information is less than or equal to a first threshold value.

Optionally, in an embodiment of the present disclosure, assuming that two first reference blocks (foreground reference blocks) for the current block have been determined to be reference_fore_0 and reference_fore_1, respectively, and one second reference block (background reference block) has been determined to be reference_back, it may be limited that the motion information motion_infor_back for determining the reference_back and one of the motion information motion_infor_fore_0 or the motion information motion_ infor_fore_1 for determining the reference_fore_0 or the reference_fore_1 need to correspond to a same reference picture, and an absolute value of a motion vector difference between the two pieces of motion information is less than or equal to a threshold value (the first threshold value), thereby realizing a limitation on a bandwidth to reduce the bandwidth.

For example, in the present disclosure, it is limited that the motion information motion_infor_back for determining the reference_back and the motion information motion_infor_ fore_0 for determining the reference_fore_0 correspond to the same reference picture, and the absolute value of the motion vector difference between the motion_infor_back and the motion_infor_fore_0 is less than or equal to the first threshold value.

Furthermore, in the embodiment of the present disclosure, if it is limited that the reference picture corresponding to the at least one piece of the second motion information is the same as the reference picture corresponding to the at least one piece of the first motion information, and the absolute value of the vector difference between the at least one piece of the second motion information and the at least one piece of the first motion information is less than or equal to the first threshold value, then when determining the at least one piece of the first motion information and the at least one piece of the second motion information, the at least one piece of the second motion information may be determined at first, and then the at least one piece of the first motion information is determined according to the first threshold value and the at least one piece of the second motion information.

Furthermore, in the embodiment of the present disclosure, if it is limited that the reference picture corresponding to the second motion information is the same as the reference picture corresponding to the first motion information or the second motion information, and the absolute value of the vector difference between the second motion information and the first motion information or the second motion information is less than or equal to the first threshold value, then when determining the at least one piece of the first motion information and the at least one piece of the second motion information, the at least one piece of the first motion information may be determined at first, and then the at least one piece of the second motion information is determined according to the first threshold value and the at least one piece of the first motion information.

Optionally, in an embodiment of the present disclosure, assuming that two first reference blocks (foreground reference blocks) for the current block have been determined to be reference_fore_0 and reference_fore_1, respectively, and one second reference block (background reference block) has been determined to be reference_back, if the motion information motion_infor_back for determining the reference_back and one of the motion information motion_infor_fore_0 or the motion information motion_infor_fore_1 for determining the reference_fore_0 or the reference_ fore_1 must correspond to a same reference picture, then the motion_infor_back may be determined according to one of the motion_infor_fore_0 or the motion_infor_fore_1, or one of the motion_infor_fore_0 or the motion_infor_fore_1 may be determined according to the motion_infor_back. For example, the motion_infor_back is determined according to the motion_infor_fore_0 and a motion vector difference (such as the first threshold value). Alternatively, the motion_infor_fore_0 is determined according to the motion_infor_back and the motion vector difference (such as the first threshold value).

For example, in the present disclosure, if it is limited that the motion information motion_infor_back for determining the reference_back and the motion information motion_infor_fore_0 for determining the reference_fore_0 correspond to the same reference picture, and the absolute value of the motion vector difference between the motion_infor_back and the motion_infor_fore_0 is less than or equal to the first threshold value, then the motion_infor_back may be determined at first, and then the motion_infor_fore_0 is determined according to the motion_infor_back and the first threshold value. Alternatively, the motion_infor_fore_0 may be determined at first, and then the motion_infor_back is determined according to the motion_infor_fore_0 and the first threshold value.

Furthermore, in the embodiment of the present disclosure, if it is also possible to determine a reference block in the APM using a sub-block-based prediction method, such as affine prediction or the other prediction methods, then the motion vector difference within the motion vector group that is used for determining motion information of a reference block reference_fore_0 or reference_fore_1 or reference_back in the APM may be limited, for example, an absolute value of the motion vector difference within the motion vector group is limited to be less than or equal to a threshold value, thereby realizing a limitation on a bandwidth to reduce the bandwidth.

Optionally, in the present disclosure, it may be limited that an absolute value of a difference between any two piece of motion information in the at least one piece of the first motion information and the at least one piece of the second motion information is less than or equal to a second threshold value.

Furthermore, in the present disclosure, the corresponding at least one piece of the first motion information and at least one piece of the second motion information may be obtained according to information of neighbouring blocks of the current block, or the corresponding at least one piece of the first motion information and at least one piece of the second motion information may also be obtained according to a motion information list, so that the corresponding at least one first reference block and at least one second reference block may be further determined based on the at least one piece of the first motion information and the at least one piece of the second motion information.

Furthermore, in an embodiment of the present disclosure, when determining the at least one first reference block and the at least one second reference block based on the at least one piece of the first motion information and the at least one piece of the second motion information, at least one first reference picture and at least one second reference picture may be determined at first; then the at least one first reference picture is interpolated according to the at least one piece of the first motion information, to obtain the at least one first reference block; and the at least one second reference picture is interpolated according to the at least one piece of the second motion information, to obtain the at least one second reference block.

That is to say, in the present disclosure, when determining the reference block(s) based on the motion information, it is possible to select to perform fractional-pixel interpolation on an integer-pixel reference picture by using the motion information so as to obtain the corresponding reference block(s).

Furthermore, in an embodiment of the present disclosure, when determining the at least one first reference block and the at least one second reference block based on the at least one piece of the first motion information and the at least one piece of the second motion information, at least one first reference picture and at least one second reference picture may be determined at first; then the at least one first reference picture is predicted according to the at least one piece of the first motion information, to obtain the at least one first reference block; and the at least one second reference picture is predicted according to the at least one piece of the second motion information, to obtain the at least one second reference block.

That is to say, in the present disclosure, when determining the reference block based on the motion information, it is possible to select to perform prediction (e.g. affine prediction) on the reference picture by using the motion information so as to obtain the corresponding reference block.

Thus, in the embodiments of the present disclosure, the at least one first reference block and the at least one second reference block may be integer-pixel reference blocks that are directly intercepted from the reference picture, or may be reference blocks obtained by performing the fractional-pixel interpolation on the integer-pixel reference picture based on the motion information, or may be reference blocks obtained by performing the affine prediction on the original reference picture based on the motion information, or may be reference blocks obtained by using other processing methods, which are not specifically limited in the present disclosure.

At operation 203, a prediction value of the current block is determined according to the at least one first reference block and the at least one second reference block.

In an embodiment of the present disclosure, if the inter prediction mode parameter indicates that an APM is used for the current block to determine an inter prediction value of the current block, then after the at least one first reference block and the at least one second reference block for the current block are determined, the prediction value of the current block may be further determined according to the at least one first reference block and the at least one second reference block.

Furthermore, in the embodiment of the present disclosure, when determining the prediction value of the current block according to the at least one first reference block and the at least one second reference block, a weight value may be determined according to the at least one first reference block at first, and the prediction value of the current block may then be determined based on the weight value, the at least one first reference block and the at least one second reference block.

That is to say, in the embodiment of the present disclosure, if the inter prediction mode parameter indicates that an APM is used for the current block to determine an inter prediction value of the current block, then after the at least one first reference block and the at least one second reference block for the current block are determined, the weight value may be further determined according to the at least one first reference block.

It should be noted that in an embodiment of the present disclosure, the weight value of the current block may be a weight matrix of the current block, and the weight matrix includes weight matrixes of sub-blocks of the current block or a weight value of each pixel position of the current block.

Optionally, in the embodiment of the present disclosure, the weight matrix of the current block may be determined based on the at least one first reference block, and then the prediction value of the current block may be obtained based on the weight matrix of the current block, the at least one first reference block and the at least one second reference block.

Optionally, in the embodiment of the present disclosure, when determining the prediction value of the current block, one method is to select to obtain, for each sub-block of the current block, a weight matrix of the sub-block, and then obtain a prediction value of the sub-block according to the reference blocks (the first reference block and the second reference block) and the weight matrix of the sub-block. Another method is to obtain a weight value for each position (pixel position) of the current block, and obtain a prediction value of the position according to a reference value (a pixel reference value) of each position and the weight value.

In contrast, the above two methods for determining the prediction value of the current block are essentially different in processing granularity, because the weight matrix of the current block can be obtained after combining the weight matrices of the sub-blocks of the current block, and the weight matrix of the current block can also be obtained after combining the weight value of each position (pixel position) of the current block. A smaller processing granularity may save storage space.

It should be noted that in the embodiment of the present disclosure, the weight value (weight matrix) of the current block may include either the weight value corresponding to each pixel position in the current block or the weight matrix corresponding to each sub-block in the current block, that is, the weight value of the current block is essentially the weight of the sub-blocks or the weight of the pixels. That is to say, although the present disclosure is described in units of a whole block, it is substantially included in unit of a sub-block or a pixel.

It should be noted that in the embodiment of the present disclosure, for a pixel position of the current block, a weight value corresponding to the pixel position may be determined by using the pixel value of the pixel position in the at least one first reference block, so that the weight value of the current block may be constructed after traversing each pixel position and obtaining all the weight values corresponding to all the pixel positions.

Optionally, in the embodiment of the present disclosure, assuming that the at least one first reference block includes two different reference blocks, which are respectively a first block and a second block, when determining the weight value according to the at least one first reference block, for a pixel position, at first, a first pixel value of the pixel position in the first block may be determined and a second pixel value of the pixel position in the second block may be determined at the same time. Then, a weight value corresponding to the pixel position may be determined according to the first pixel value and the second pixel value. Finally, after traversing all pixel positions and determining all weight values corresponding to all pixel positions, the weight value of the current block may be determined according to all the weight values.

For example, in the present disclosure, the first block is represented as reference_fore_0, and the second block is represented as reference_fore_1. For a pixel position (i, j), the first pixel value in the first block reference_fore_0 is reference_fore_0[i][j], and the second pixel value in the second block reference_fore_1 is reference_fore_1[i][j]. Then, the weight value weight_matrix[i][j] corresponding to the pixel position (i, j) in the current block may be determined according to the first pixel value reference_fore_0[i][j] and the second pixel value reference_fore_1[i][j], and after determining a weight value corresponding to each pixel position, a weight matrix weight_matrix of the current block is generated according to the weight values corresponding to all pixel positions.

For example, in the embodiment of the present disclosure, the determination of the weight value weight_matrix[i][j] corresponding to the pixel position (i, j) in the current block may be performed through the above formula (1). A value of n is greater than 0. It should be understood that a value of a weight value corresponding to any one pixel position is greater than or equal to 0 and less than or equal to n, i.e., the maximum value of the weight value in the weight matrix is n and the minimum value is 0.

It can be seen from the above formula (1) that the size of the weight value weight_matrix[i][j] is determined jointly by the first pixel value reference_fore_0[i][j] in the first block and the second pixel value reference_fore_1[i][j] in the second block. The closer the values of the reference_fore_0[i][j] and the reference_fore_1[i][j] are, the greater the value of the weight value weight_matrix[i][j] is, and the greater the difference between the values of the reference_fore_0[i][j] and the reference_fore_1[i][j] is, the smaller the value of weight value weight_matrix[i][j] is.

Furthermore, in the embodiment of the present disclosure, in order to further reduce the influence of noises, for a pixel position of the current block, the determination of a weight value corresponding to the pixel position may be performed by using a pixel value of the pixel position in the at least one first reference block (e.g., the first block and the second block) and a pixel value of a neighbouring pixel position around the pixel position, so that the weight matrix of the current block may be constructed after traversing each pixel position and obtaining all weight values corresponding to all the pixel positions.

That is to say, in the present disclosure, the weight value corresponding to one pixel position of the current block may be derived from the pixel values of multiple pixel positions in the first block and the second block. The multiple pixel positions may include the one pixel position and a neighbouring pixel position adjacent to the one pixel position.

Optionally, in the embodiment of the present disclosure, assuming that the at least one first reference block includes two different reference blocks, which are respectively a first block and a second block, when determining the weight value according to the at least one first reference block, for a pixel position, a first pixel value of the pixel position and a first neighbouring pixel value of a neighbouring pixel position of the pixel position in the first block may be determined at first, and a second pixel value of the pixel position and a second neighbouring pixel value of a neighbouring pixel position of the pixel position in the second block may be determined simultaneously. Then, a weight value corresponding to the pixel position may be determined according to the first pixel value, the first neighbouring pixel value, the second pixel value and the second neighbouring pixel value. Finally, after traversing all pixel positions and determining all weight values corresponding to all the pixel positions, the weight value of the current block may be determined according to all the weight values.

For example, in the present disclosure, the first block is represented as reference_fore_0, and the second block is represented as reference_fore_1. For a pixel position (i, j), the first pixel value in the first block is reference_fore_0[i][j], the first neighbouring pixel value in the first block reference_fore_0 and corresponding to a neighbouring pixel position adjacent to the pixel position position (i, j), the second pixel value in the second block reference_fore_1 is reference_fore_1[i][j], and the second neighbouring pixel value, in the second block reference_fore_1, of a neighbouring pixel position adjacent to the pixel position position (i, j). Then, the weight value weight_matrix[i][j] corresponding to the pixel position (i, j) in the current block may be determined according to the first pixel value reference_fore_0[i][j], the first neighbouring pixel value, the second pixel value reference_fore_1[i][j] and the second neighbouring pixel value, and after determining the weight value corresponding to each pixel position, a weight matrix weight_matrix of the current block may be generated according to the weight values corresponding to all the pixel positions.

It should be noted that in the embodiment of the present disclosure, the neighbouring pixel position adjacent to the pixel position (i, j) may include an upper pixel position (i−1, j), a lower pixel position (i+1, j), a left pixel position (i, j−1), and a right pixel position (i, j+1) of the pixel position (i, j).

For example, in an embodiment of the present disclosure, the determination of the weight value weight_matrix[i][j] corresponding to the pixel position (i, j) in the current block may be performed through the above formula (2). The (m, n) may include the pixel position (i, j) and neighbouring pixel positions (i−1, j), (i+1, j), (i, j−1), (i, j+1) around the pixel position.

It can be seen from the above formula (2) that a size of the weight value weight_matrix[i][j] is determined jointly by the pixel value reference_fore_0[m][n] in the first block and the pixel value reference_fore_1[m][n] in the second block. The closer the cumulative sum of the reference_fore_0[m][n] and the cumulative sum of the reference_fore_1[m][n] are, the greater the value of weight value weight_matrix[i][j] is, the greater the difference between the cumulative sum of the reference_fore_0[m][n] and the cumulative sum of the reference_fore_1[m][n] is, the smaller the value of the weight value weight_matrix[i][j] is.

It should be noted that in the embodiment of the present disclosure, for each pixel position, the corresponding weight value may be derived from the pixel values of multiple pixel positions. The multiple pixel positions are not only limited to the pixel position and neighbouring pixel positions around the pixel position, but may also include the pixel position and any other multiple pixel positions, so that the influence of noises may be reduced.

Further, in the embodiment of the present disclosure, when determining the weight value according to the at least one first reference block, for a pixel position, it is possible to select to adjust the weight value corresponding to the pixel position by using at least one weight value corresponding to the other pixel position.

That is to say, in the embodiment of the present disclosure, after the generation of the weight matrix (weight values) of the current block is completed, the weight matrix weight_matrix of the current block may also be adjusted. For example, for each pixel position (i, j), the weight value weight_matrix[i][j] corresponding to the pixel position may be adjusted based on multiple weight values corresponding to multiple positions, so that noises may be further removed, which enable a transition region to be smoother.

Further, in the embodiment of the present disclosure, after determining the weight value according to the at least one first reference block, an inter prediction may be further performed on the current block based on the weight value, the at least one first reference block and the at least one second reference block, so that the prediction value of the current block may be determined.

It should be understood that in the embodiment of the present disclosure, when determining the prediction value of the current block, the pixel value of each pixel position may be predicted based on the weight value of each pixel position in the weight values and the pixel value of each pixel position in the at least one first reference block and the at least one second reference block, and finally the inter prediction for the current block may be completed to obtain the corresponding prediction value.

Optionally, in the embodiment of the present disclosure, when determining the prediction value of the current block based on the weight value, the at least one first reference block and the at least one second reference block, for a pixel position, the weight value corresponding to the pixel position may be determined based on the weight value of the current block, the at least one first pixel value corresponding to the pixel position may be determined based on the at least one first reference block, and the at least one second pixel value corresponding to the pixel position may be determined based on the at least one second reference block. Then, according to the weight value corresponding to the pixel position, the at least one first pixel value and the at least one second pixel value are weighted summed to determine a prediction pixel value corresponding to the pixel position. Finally, after traversing all pixel positions and determining all prediction pixel values corresponding to all the pixel positions, the prediction value of the current block may be determined according to all the prediction pixel values.

Optionally, in the embodiment of the present disclosure, assuming that the at least one first reference block includes two different reference blocks, which are respectively a first block and a second block, for a pixel position, the weight value corresponding to the pixel position is determined, a third pixel value corresponding to the pixel position is determined based on the first block, a fourth pixel value corresponding to the pixel position is determined based on the second block, and at least one pixel value corresponding to the pixel position is determined based on the at least one second reference block. Then, a prediction pixel value corresponding to the pixel position is determined, by weighted summing the third pixel value and/or the fourth pixel value and the at least one pixel value according to the weight value corresponding to the pixel position.

Optionally, in the embodiment of the present disclosure, assuming that the at least one first reference block includes two different reference blocks, which are respectively a first block and a second block, and one second reference block is determined simultaneously, then for a pixel position, the weight value corresponding to the pixel position is determined, a third pixel value corresponding to the pixel position is determined based on the first block, a fourth pixel value corresponding to the pixel position is determined based on the second block, and a fifth pixel value corresponding to the pixel position is determined based on one second reference block. Then, a prediction pixel value corresponding to the pixel position is determined, by weighted summing the third pixel value and/or the fourth pixel value and the fifth pixel value according to the weight value corresponding to the pixel position.

It should be noted that in the embodiment of the present disclosure, the maximum value of any one of the weight values (weight matrix) of the current block is n, and the minimum value is 0. If a value of the weight value weight_matrix[i][j] corresponding to the pixel position (i, j) is equal to n, then it may be considered that the prediction pixel value of the pixel position is determined based on the pixel value reference_fore[i][j] of the pixel position in the at least one first reference block. If the value of the weight value weight_matrix[i][j] corresponding to the pixel position (i, j) is equal to 0, then it may be considered that the prediction pixel value of the pixel position is determined based on the pixel value reference_back [i][j] of the pixel position in the at least one second reference block. If the value of the weight value weight_matrix[i][j] corresponding to the pixel position (i, j) is greater than 0 and less than n, then it may be considered that the prediction pixel value of the pixel position is determined jointly based on the pixel value reference_back [i][j] of the pixel position in the at least one second reference block and the pixel value reference_fore [i][j] of the pixel position in the at least one first reference block.

For example, in the embodiment of the present disclosure, assuming that the at least one first reference block includes two different reference blocks, which are respectively a first block reference_fore_0 and a second block reference_fore_1, and one second reference block reference_back is determined, a prediction pixel value Prediction[i][j] corresponding to the pixel position (i, j) in the current block may be determined through the above formula (3). When determining the prediction pixel value Prediction[i][j] corresponding to the pixel position (i, j), a 1-to-1 weighted operation is performed on the reference_fore_0[i][j] and the reference_fore_1[i][j].

For example, in the embodiment of the present disclosure, the prediction pixel value Prediction [i] [j] corresponding to the pixel position (i, j) in the current block may be determined through the above formula (4). When determining the prediction pixel value Prediction [i] [j] corresponding to the pixel position (i, j), only the reference_fore_0 [i] [j] is referred to and the reference_fore_1 [i] [j] is not referred to.

For example, in the embodiment of the present disclosure, the prediction pixel value Prediction[i][j] corresponding to the pixel position (i, j) in the current block may be determined through the above formula (5). When determining the prediction pixel value Prediction[i][j] corresponding to the pixel position (i, j), only the reference_fore_1[i][j] is referred to and the reference_fore_0[i][j] is not referred to.

Further, in the embodiment of the present disclosure, after all prediction pixel values corresponding to all pixel positions are determined based on the prediction method of the prediction pixel values of the above pixel positions, a prediction block of the current block may be generated according to all the prediction pixel values.

It should be understood that in the embodiment of the present disclosure, two first reference blocks may be used to determine the adaptive partitioning, and simultaneously the two first reference blocks are used to determine the prediction value of the foreground portion. Accordingly, two or more first reference blocks may be used to determine the adaptive partitioning, and simultaneously the two or more first reference blocks are used to determine the prediction value of the foreground portion.

That is to say, in the embodiment of the present disclosure, the at least one first reference block may also include at least two first reference blocks.

Accordingly, in the embodiment of the present disclosure, when determining the prediction value of the current block based on the weight value, the at least one first reference block and the at least one second reference block, it is possible to select to determine the weight value according to the at least two first reference blocks. Then, the prediction value of the current block is determined based on the weight value, the at least one second reference block, and at least one first reference block in the at least two first reference blocks.

That is to say, in the present disclosure, in order to be able to better reduce noises, and reduce the influence of factors such as fine deformation, in the APM, more first reference blocks may be used to determine the adaptive partitioning and the prediction value of the foreground portion. It may be achieved by averaging or weighted averaging the multiple first reference blocks, which is not specifically limited in the present disclosure.

Further, in the embodiment of the present disclosure, since noises can be better reduced and the influence of factors such as fine deformation can be reduced by using two or more reference blocks for averaging or weighted averaging, for the background portion, it is also possible to select to use two or more second reference blocks for averaging or weighted averaging to obtain the prediction value of the background portion.

That is to say, in the embodiment of the present disclosure, the at least one second reference block may also include at least two second reference blocks.

Accordingly, in the embodiment of the present disclosure, when determining the prediction value of the current block based on the weight value, the at least one first reference block and the at least one second reference block, it is possible to select to determine the prediction value of the current block based on the weight value, at least one first reference block in the at least two first reference blocks and at least one second reference block in the at least one second reference block.

For example, in the present disclosure, the use of two first reference blocks and two second reference blocks is taken as an example for illustration. The at least one first reference block includes a first block and a second block, and the at least one second reference block includes a third block and a fourth block, i.e., in the APM, two first reference blocks containing foreground contents in the current block are the first block reference_fore_0 and the second block reference_fore_1, and two second reference blocks containing background contents in the current block are the third block reference_back_0 and the fourth block reference_back_1. The weight matrix weight_matrix may be generated according to the reference_fore_0 and the reference_fore_1.

Optionally, in the embodiment of the present disclosure, assuming that the at least one first reference block includes two different reference blocks, which are respectively a first block and a second block, and the at least one second reference block includes two different reference blocks, which are respectively a third block and a fourth block, when determining a prediction value of the current block based on the weight value, the at least one first reference block and the at least one second reference block, for a pixel position, a weight value corresponding to the pixel position may be determined, a third pixel value corresponding to the pixel position may be determined based on the first block, a fourth pixel value corresponding to the pixel position may be determined based on the second block, a sixth pixel value corresponding to the pixel position may be determined based on the third block, and a seventh pixel value corresponding to the pixel position may be determined based on the fourth block. Then, a prediction pixel value corresponding to the pixel position may be determined by weighted summing the third pixel value and/or the fourth pixel value, the sixth pixel value and the seventh pixel value according to the weight value corresponding to the pixel position.

It should be noted that in the embodiment of the present disclosure, the maximum value of any one of the weight values in the weight matrix is n, and the minimum value is 0. If the weight value weight_matrix[i][j] corresponding to the pixel position (i, j) is equal to n, it may be considered that the prediction pixel value of the pixel position is determined based on the pixel value reference_fore_0[i][j] of the pixel position in the first block and/or the pixel value reference_fore_1[i][j] of the pixel position in the second block. If the weight value weight_matrix[i][j] corresponding to the pixel position (i, j) is equal to 0, it may be considered that the prediction pixel value of the pixel position is determined based on the pixel value reference_back_0[i][j] of the pixel position in the third block and the pixel value reference_back_1[i][j] of the pixel position in the fourth block. If the weight value weight_matrix[i][j] corresponding to the pixel position (i, j) is greater than 0 and less than n, it may be considered that the prediction pixel value of the pixel position is determined based on the pixel value reference_fore_0[i][j] of the pixel position in the first block and/or the pixel value reference_fore_1[i][j] of the pixel position in the second block, and the pixel value reference_back_0[i][j] of the pixel position in the third block and the pixel value reference_back_1[i][j] of the pixel position in the fourth block.

For example, in the embodiment of the present disclosure, the prediction pixel value Prediction[i][j] corresponding to the pixel position (i, j) in the current block may be determined through the above formula (7). When determining the prediction pixel value Prediction[i][j] corresponding to the pixel position (i, j), a 1-to-1 weighted operation is performed on the reference_fore_0[i][j] and the reference_fore_1[i][j], and a 1-to-1 weighted operation is performed on the reference_back_0[i][j] and the reference_back_1[i][j] at the same time.

For example, in the embodiment of the present disclosure, the prediction pixel value Prediction[i][j] corresponding to the pixel position (i, j) in the current block may be determined through the above formula (8). When determining the prediction pixel value Prediction[i][j] corresponding to the pixel position (i, j), only the reference_fore_0[i][j] is referred to and the reference_fore_1[i][j] is not referred to, and at the same time only the reference_back_1[i][j] is referred to and the reference_back_0[i][j] is not referred to.

For example, in the embodiment of the present disclosure, the prediction pixel value Prediction[i][j] corresponding to the pixel position (i, j) in the current block may be determined through the above formula (9). When determining the prediction pixel value Prediction[i][j] corresponding to the pixel position (i, j), only the reference_fore_1[i][j] is referred to and the reference_fore_0[i][j] is not referred to, and at the same time only the reference_back_0[i][j] is referred to and the reference_back_1[i][j] is not referred to.

Further, in the embodiment of the present disclosure, after all prediction pixel values corresponding to all pixel positions are determined based on the prediction method of the prediction pixel values of the above pixel positions, a prediction block of the current block may be generated according to all the prediction pixel values.

Specifically, in the present disclosure, if the APM is used for the current block and four reference blocks are required for the inter prediction, where the four reference blocks are respectively two first reference blocks, i.e., the first block reference_fore_0 and the second block reference_fore_1, and two second reference blocks, i.e., the third block reference_back_0 and the fourth block reference_back_1. Four pieces of motion information may be determined at first, and these four pieces of motion information may be obtained according to information of neighbouring blocks of the current block, or a motion information list, so that four reference blocks may be further determined according to the four pieces of motion information. The four reference blocks may be integer-pixel reference blocks directly intercepted from the reference picture, or may be reference blocks obtained by performing the fractional-pixel interpolation on the integer-pixel reference pictures based on the motion information, or may be reference blocks obtained by performing the affine prediction on the original reference picture based on the motion information, or may be reference blocks obtained by using other processing methods, which are not specifically limited in the present disclosure.

Figure 16:
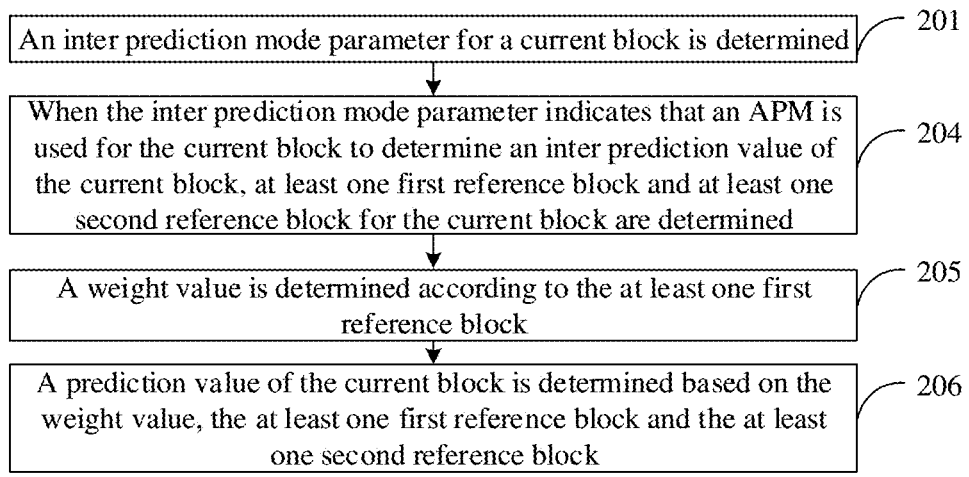
FIG. 16 is a fourth schematic flowchart of implementation of a method for inter prediction.

Further, in the embodiment of the present disclosure, the inter prediction method applied to the decoder is proposed through the above operations 201 to 203. FIG. 16 is a fourth schematic flowchart of implementation of a method for inter prediction. As shown in FIG. 16, the method for inter prediction performed by the encoder may further include the following operations.

At operation 101, an inter prediction mode parameter for a current block is determined.

At operation 204, when the inter prediction mode parameter indicates that an APM is used for the current block to determine an inter prediction value of the current block, at least one first reference block and at least one second reference block for the current block are determined.

At operation 205, a weight value is determined according to the at least one first reference block.

At operation 206, a prediction value of the current block is determined based on the weight value, the at least one first reference block and the at least one second reference block.

To sum up, through the method for inter prediction proposed in the above operation 201 to operation 206, after determining that the APM is used for the current block, at least one reference block containing foreground contents in the current block, i.e., the at least one first reference block reference_fore, and at least one reference block containing background contents in the current block, i.e., the at least one second reference block reference_back, can be determined simultaneously. Then, the weight value can be generated according to the at least one first reference block reference_fore, and finally the prediction value of the current block can be determined based on the weight value in combination with the at least one first reference block and the at least one second reference block.

It should be noted that the inter prediction method proposed in the present disclosure is a prediction method based on an APM, Since the APM can realize an irregular partitioning of the current block, it can be considered that the APM mode (partitioning simulated by the APM) is finer than a GPM, thereby obtaining a better prediction effect.

In the inter prediction method provided by the embodiment of the present disclosure, a decoder determines an inter prediction mode parameter for a current block; when the inter prediction mode parameter indicates that an APM is used for the current block to determine an inter prediction value of the current block, determines at least one first reference block and at least one second reference block for the current block, where the APM is used for partitioning of arbitrary shapes based on picture contents; and determines a prediction value of the current block according to the at least one first reference block and the at least one second reference block. That is to say, in the embodiment of the present disclosure, based on the APM, a codec can obtain the at least one first reference block and the at least one second reference block, then implement the partitioning of arbitrary shapes through the at least one first reference block, and finally can predict the current block in combination with the at least one first reference block and the at least one second reference block, so that an inter prediction in which the video contents are adaptively partitioned is implemented, which can reduce the complexity on the basis of improving the accuracy of the inter prediction, and realize a simple and efficient encoding and decoding method, thereby improving the compression performance.

Figure 17:
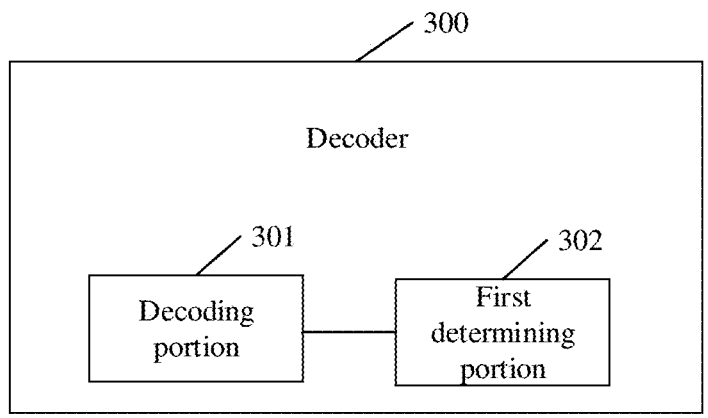
FIG. 17 is a first schematic diagram of a composition structure of a decoder provided by an embodiment of the present disclosure.

Based on the above embodiments, in another embodiment of the present disclosure, FIG. 17 is a first schematic diagram of a composition structure of a decoder provided by an embodiment of the present disclosure. As shown in FIG. 17, the decoder 300 provided in the embodiment of the present disclosure may include a decoding portion 301 and a first determining portion 302.

The decoding portion is configured to decode a bitstream.

The first determining portion 302 is configured to determine an inter prediction mode parameter for a current block; determine at least one first reference block and at least one second reference block for the current block when the inter prediction mode parameter indicates that an APM is used for the current block to determine an inter prediction value of the current block, where the APM is used for partitioning of arbitrary shapes based on picture contents; and determine a prediction value of the current block according to the at least one first reference block and the at least one second reference block.

The first determining portion is further configured to determine an inter prediction mode parameter for a current block; determine at least one first reference block and at least one second reference block for the current block when the inter prediction mode parameter indicates that an APM is used for the current block to determine an inter prediction value of the current block; determine a weight value according to the at least one first reference block; and determine a prediction value of the current block based on the weight value, the at least one first reference block and the at least one second reference block.

Figure 18:
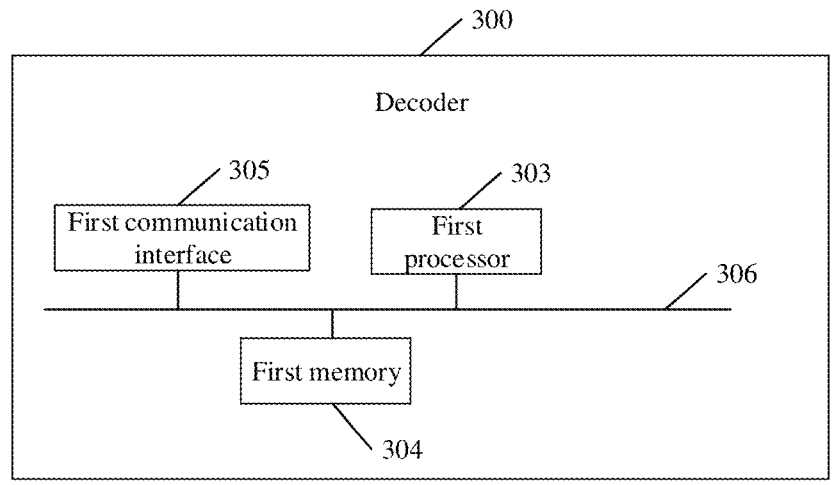
FIG. 18 is a second schematic diagram of a composition structure of a decoder provided by an embodiment of the present disclosure.

FIG. 18 is a second schematic diagram of a composition structure of an decoder provided by an embodiment of the present disclosure. As shown in FIG. 18, the decoder 300 provided by the embodiment of the present disclosure may further include a first processor 303, a first memory 304 storing instructions executable by the first processor 303, a first communication interface 305 and a first bus 306 used for connecting the first processor 303, the first memory 304 and the first communication interface 305.

Further, in the embodiment of the present disclosure, the first processor 303 is configured to decode a bitstream to determine an inter prediction mode parameter for a current block; when the inter prediction mode parameter indicates that an APM is used for the current block to determine an inter prediction value of the current block, determine at least one first reference block and at least one second reference block for the current block, where the APM is used for partitioning of arbitrary shapes based on picture contents; and determine a prediction value of the current block according to the at least one first reference block and the at least one second reference block. The first processor 303 is also configured to determine an inter prediction mode parameter for a current block; when the inter prediction mode parameter indicates that a APM is used for the current block to determine an inter prediction value of the current block, determine at least one first reference block and at least one second reference block for the current block; determine a weight value according to the at least one first reference block; and determine a prediction value of the current block based on the weight value, the at least one first reference block and the at least one second reference block.

Figure 19:
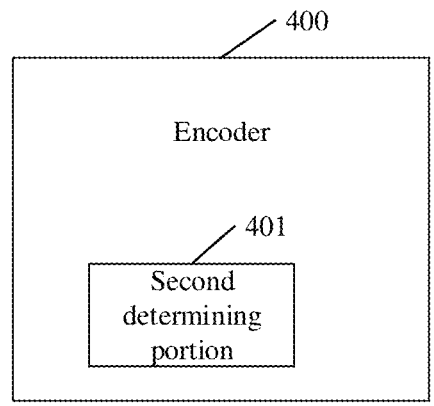
FIG. 19 is a first schematic diagram of a composition structure of an encoder provided by an embodiment of the present disclosure.

FIG. 19 is a first structure schematic diagram of a composition structure of a encoder provided by an embodiment of the present disclosure. As shown in FIG. 19, the encoder provided by an embodiment of the present disclosure may include a second determining portion 401.

The second determining portion 401 is configured to determine an inter prediction mode parameter for a current block; determine at least one first reference block and at least one second reference block for the current block when the inter prediction mode parameter indicates that an APM is used for the current block to determine an inter prediction value of the current block, where the APM is used for partitioning of arbitrary shapes based on picture contents; and determine a prediction value of the current block according to the at least one first reference block and the at least one second reference block.

The second determining portion 401 is further configured to determine an inter prediction mode parameter for a current block; determine at least one first reference block and at least one second reference block for the current block when the inter prediction mode parameter indicates that an APM is used for the current block to determine an inter prediction value of the current block; determine a weight value according to the at least one first reference block; and determine a prediction value of the current block based on the weight value, the at least one first reference block and the at least one second reference block.

Figure 20:
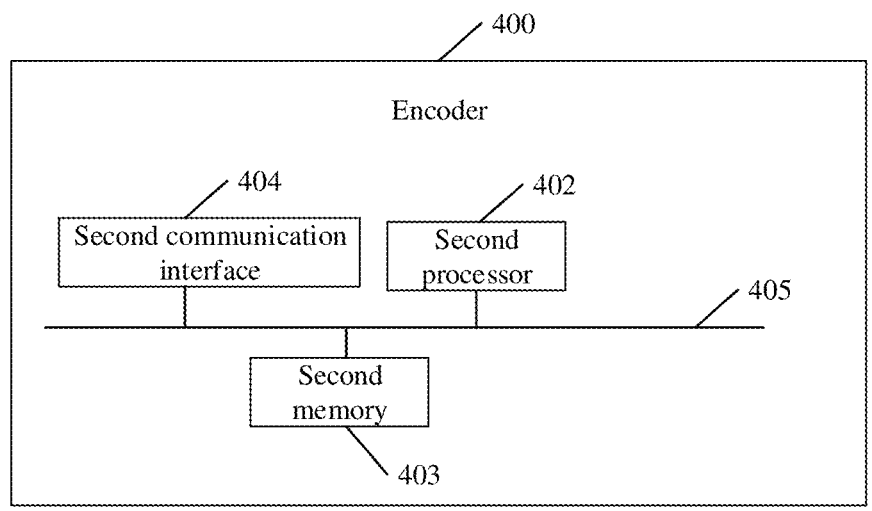
FIG. 20 is a second schematic diagram of a composition structure of an encoder provided by an embodiment of the present disclosure.

FIG. 20 is a second structure schematic diagram of a composition structure of a encoder provided by an embodiment of the present disclosure. As shown in FIG. 20, the encoder 400 provided by the embodiment of the present disclosure may include a second processor 402, a second memory 403 storing instructions executable by the second processor 402, a second communication interface 404 and a second bus 405 used for connecting the second processor 402, the second memory 403 and the second communication interface 404.

Further, in the embodiment of the present disclosure, the second processor 402 is configured to determine an inter prediction mode parameter for a current block; when the inter prediction mode parameter indicates that an APM is used for the current block to determine an inter prediction value of the current block; determine at least one first reference block and at least one second reference block for the current block, where the APM is used for partitioning of arbitrary shapes based on picture contents; and determine a prediction value of the current block according to the at least one first reference block and the at least one second reference block. The first processor 303 is also configured to determine an inter prediction mode parameter for a current block; when the inter prediction mode parameter indicates that a APM is used for the current block to determine an inter prediction value of the current block, determine at least one first reference block and at least one second reference block for the current block; determine a weight value according to the at least one first reference block; and determine a prediction value of the current block based on the weight value, the at least one first reference block and the at least one second reference block.

In addition, each functional module in the present embodiment may be integrated in one processing unit, each unit may exist physically alone, or two or more units may be integrated in one unit. The integrated unit may be realized either in a form of hardware or in a form of software functional module.

When being realized in the form of software functional module and sold or used as an independent product, the integrated unit may also be stored in a computer-readable storage medium. Based on such an understanding, the technical solutions of the present embodiment substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) or a processor to execute all or part of the operations of the method in the present embodiment. The abovementioned storage medium includes: various media capable of storing program codes such as a U disk, a mobile hard disk, a Read Only Memory (ROM), a Random Access Memory (RAM), a magnetic disk or an optical disk.

The embodiments of the present disclosure provide an encoder and a decoder, based on the APM, the decoder and the encoder can obtain the at least one first reference block and the at least one second reference block, then implement partitioning of arbitrary shapes through the at least one first reference block, and finally can predict the current block in combination with the at least one first reference block and the at least one second reference block, so that an inter prediction in which the video contents are adaptively partitioned is implemented, which can reduce the complexity on the basis of improving the accuracy of the inter prediction, and realize a simple and efficient encoding and decoding method, thereby improving the compression performance.

An embodiment of the present disclosure provides a computer readable storage medium having stored thereon computer programs that, when executed by a processor, implement the method described in the above embodiments.

Specifically, the program instructions corresponding to the inter prediction method in the embodiment may be stored on a storage medium such as an optical disk, a hard disk, a U disk, etc. When the program instructions corresponding to the inter prediction method in the storage medium is read or executed by an electronic device, the following operations are included.

A bitstream is decoded to determine an inter prediction mode parameter for a current block.

When the inter prediction mode parameter indicates that an APM is used for the current block to determine an inter prediction value of the current block, at least one first reference block and at least one second reference block for the current block are determined. The APM is used for partitioning of arbitrary shapes based on picture contents.

A prediction value of the current block is determined according to the at least one first reference block and the at least one second reference block.

When the program instructions corresponding to the inter prediction method in the storage medium is read or executed by an electronic device, the following operations are further included.

A bitstream is decoded to determine an inter prediction mode parameter for a current block.

When the inter prediction mode parameter indicates that an Adaptive partitioning Mode (APM) is used for the current block to determine an inter prediction value of the current block, at least one first reference block and at least one second reference block for the current block are determined.

A weight value is determined according to the at least one first reference block.

A prediction value of the current block is determined based on the weight value, the at least one first reference block and the at least one second reference block.

When the program instructions corresponding to the inter prediction method in the storage medium is read or executed by an electronic device, the following operations are further included.

An inter prediction mode parameter for a current block is determined.

When the inter prediction mode parameter indicates that an APM is used for the current block to determine an inter prediction value of the current block, at least one first reference block and at least one second reference block for the current block are determined. The APM is used for partitioning of arbitrary shapes based on picture contents.

A prediction value of the current block is determined according to the at least one first reference block and the at least one second reference block.

When the program instructions corresponding to the inter prediction method in the storage medium is read or executed by an electronic device, the following operations are further included.

An inter prediction mode parameter for a current block is determined.

When the inter prediction mode parameter indicates that an Adaptive partitioning Mode (APM) is used for the current block to determine an inter prediction value of the current block, at least one first reference block and at least one second reference block for the current block are determined.

A weight value is determined according to the at least one first reference block.

A prediction value of the current block is determined based on the weight value, the at least one first reference block and the at least one second reference block.

Those skilled in the art will appreciate that embodiments of the present disclosure may be provided as a method, a system or a computer program product. Accordingly, the present disclosure may be in form of a hardware embodiment, a software embodiment or an embodiment combining software and hardware aspects. Further, the present disclosure may be in form of a computer program product implemented on one or more computer usable storage media (including, but not limited to, a disk storage, an optical storage, etc.) containing computer usable program codes therein.

The present disclosure is described with reference to the implementation flow schematic diagrams and/or block diagrams of the method, the device (system), and the computer program product according to the embodiments of the present disclosure. It should be understood that each of the flows and/or blocks in the flow schematic diagrams and/or block diagrams, as well as combinations of the flows and/or blocks in the flow schematic diagrams and/or block diagrams, may be implemented by computer program instructions. These computer program instructions may be provided to a processor of a common purpose computer, a special purpose computer, an embedded processor, or other programmable data processing devices to generate a machine, such that the instructions executed by the processor of the computer or other programmable data processing devices generate apparatus for implementing the functions specified in one flow or multiple flows of the implementation flow schematic diagram and/or one block or multiple blocks of the block diagram.

These computer program instructions may also be stored in a computer readable memory capable of directing a computer or other programmable data processing devices to work in a specific manner, such that the instructions stored in the computer readable memory generate an manufacture including instruction apparatus that implement the functions specified in one flow or multiple flows of the implementation flow schematic diagram and/or one block or multiple blocks of the block diagram.

These computer program instructions may also be loaded onto a computer or other programmable data processing devices, such that a series of operational steps are executed on the computer or the other programmable devices to generate computer-implemented processes, thereby the instructions executed on the computer or the other programmable devices provide operations for implementing the functions specified in one flow or multiple flows of the implementation flow schematic diagram and/or one block or multiple blocks of the block diagram.

The above is only the preferred embodiments of the present disclosure, and are not intended to limit the scope of protection of the present disclosure.

INDUSTRIAL APPLICABILITY

Embodiments of the present disclosure provide an inter prediction method, an encoder, a decoder and a storage medium. The decoder decodes a bitstream to determine an inter prediction mode parameter for a current block; when the inter prediction mode parameter indicates that an Adaptive partitioning Mode (APM) is used for the current block to determine an inter prediction value of the current block, determine at least one first reference block and at least one second reference block for the current block, where the APM is used for partitioning of arbitrary shapes based on picture contents; and determine a prediction value of the current block according to the at least one first reference block and the at least one second reference block. The encoder determines an inter prediction mode parameter for a current block; when the inter prediction mode parameter indicates that an Adaptive partitioning Mode (APM) is used for the current block to determine an inter prediction value of the current block, determine at least one first reference block and at least one second reference block for the current block; and determine a prediction value of the current block according to the at least one first reference block and the at least one second reference block. That is to say, in the embodiments of the present disclosure, based on the APM, the decoder and the encoder can obtain the at least one first reference block and the at least one second reference block, then implement partitioning of arbitrary shapes through the at least one first reference block, and finally can predict the current block in combination with the at least one first reference block and the at least one second reference block, so that an inter prediction in which the video contents are adaptively partitioned is implemented, which can reduce the complexity on the basis of improving the accuracy of the inter prediction, and realize a simple and efficient encoding and decoding method, thereby improving the compression performance.

The invention claimed is:

1. A method for inter prediction, applied to a decoder, the method comprising:
    decoding a bitstream to determine an inter prediction mode parameter for a current block;
    determining, when the inter prediction mode parameter indicates that an Adaptive partitioning Mode (APM) is used for the current block to determine an inter prediction value of the current block, at least one first reference block and at least one second reference block for the current block; wherein the APM is used for partitioning of arbitrary shapes based on picture contents, wherein the partitioning is an actual partitioning or a simulated partitioning; and
    determining a prediction value of the current block according to the at least one first reference block and the at least one second reference block,
    wherein determining the prediction value of the current block according to the at least one first reference block and the at least one second reference block comprises:
    determining a weight value according to the at least one first reference block; and
    determining the prediction value of the current block based on the weight value, the at least one first reference block and the at least one second reference block,
    wherein the at least one first reference block comprises a first block and a second block.

2. The method of claim 1, wherein determining the weight value according to the at least one first reference block comprises:
    for a pixel position, determining a first pixel value of the pixel position in the first block, and determining a second pixel value of the pixel position in the second block; and
    determining a weight value corresponding to the pixel position according to the first pixel value and the second pixel value.

3. The method of claim 1, wherein determining the weight value according to the at least one first reference block comprises:
    for a pixel position, determining a first pixel value of the pixel position and a first neighbouring pixel value of a neighbouring pixel position of the pixel position in the first block, and determining a second pixel value of the pixel position and a second neighbouring pixel value of a neighbouring pixel position of the pixel position in the second block; and
    determining a weight value corresponding to the pixel position according to the first pixel value, the first neighbouring pixel value, the second pixel value and the second neighbouring pixel value.

4. The method of claim 1, wherein determining the weight value according to the at least one first reference block comprises:
    for a pixel position, adjusting a weight value corresponding to the pixel position by using a weight value corresponding to another pixel position.

5. The method of claim 1, wherein determining the prediction value of the current block based on the weight value, the at least one first reference block and the at least one second reference block comprises:
    for a pixel position, determining a weight value corresponding to the pixel position, determining a third pixel value corresponding to the pixel position based on the first block, determining a fourth pixel value corresponding to the pixel position based on the second block, and determining at least one pixel value corresponding to the pixel position based on the at least one second reference block; and
    determining a prediction pixel value corresponding to the pixel position, by weighted summing the at least one pixel value and at least one of the third pixel value or the fourth pixel value according to the weight value corresponding to the pixel position.

6. The method of claim 1, wherein determining the prediction value of the current block based on the weight value, the at least one first reference block and the at least one second reference block comprises:
for a pixel position, determining a weight value corresponding to the pixel position, determining a third pixel value corresponding to the pixel position based on the first block, determining a fourth pixel value corresponding to the pixel position based on the second block, and determining a fifth pixel value corresponding to the pixel position based on one second reference block; and
determining a prediction pixel value corresponding to the pixel position, by weighted summing the fifth pixel value and at least one of the third pixel value or the fourth pixel value and according to the weight value corresponding to the pixel position.

7. The method of claim 1, wherein the at least one second reference block comprises a third block and a fourth block,
wherein determining the prediction value of the current block based on the weight value, the at least one first reference block and the at least one second reference block comprises:
for a pixel position, determining a weight value corresponding to the pixel position, determining a third pixel value corresponding to the pixel position based on the first block, determining a fourth pixel value corresponding to the pixel position based on the second block, determining a sixth pixel value corresponding to the pixel position based on the third block, and determining a seventh pixel value corresponding to the pixel position based on the fourth block; and
determining a prediction pixel value corresponding to the pixel position, by weighted summing the sixth pixel value, the seventh pixel value and at least one of the third pixel value or the fourth pixel value according to the weight value corresponding to the pixel position.

8. The method of claim 1, wherein determining the at least one first reference block and the at least one second reference block for the current block comprises:
determining at least one piece of first motion information and at least one piece of second motion information; and
determining the at least one first reference block and the at least one second reference block based on the at least one piece of the first motion information and the at least one piece of the second motion information.

9. The method of claim 8, wherein determining the at least one piece of the first motion information and the at least one piece of the second motion information comprises:
determining at least one piece of first initial motion information and at least one piece of second initial motion information; and
refining the at least one piece of the first initial motion information and the at least one piece of the second initial motion information, respectively, to obtain the at least one piece of the first motion information and the at least one piece of the second motion information.

10. A method for inter prediction method, applied to an encoder, the method comprising:
determining an inter prediction mode parameter for a current block;
determining, when the inter prediction mode parameter indicates that an Adaptive partitioning Mode (APM) is used for the current block to determine an inter prediction value of the current block, at least one first reference block and at least one second reference block for the current block; wherein the APM is used for partitioning of arbitrary shapes based on picture contents, wherein the partitioning is an actual partitioning or a simulated partitioning; and
determining a prediction value of the current block according to the at least one first reference block and the at least one second reference block,
wherein determining the prediction value of the current block according to the at least one first reference block and the at least one second reference block comprises:
determining a weight value according to the at least one first reference block; and
determining the prediction value of the current block based on the weight value, the at least one first reference block and the at least one second reference block,
wherein the at least one first reference block comprises a first block and a second block.

11. The method of claim 10, wherein determining the weight value according to the at least one first reference block comprises:
for a pixel position, determining a first pixel value of the pixel position in the first block, and determining a second pixel value of the pixel position in the second block; and
determining a weight value corresponding to the pixel position according to the first pixel value and the second pixel value.

12. The method of claim 10, wherein determining the weight value according to the at least one first reference block comprises:
for a pixel position, determining a first pixel value of the pixel position and a first neighbouring pixel value of a neighbouring pixel position of the pixel position in the first block, and determining a second pixel value of the pixel position and a second neighbouring pixel value of a neighbouring pixel position of the pixel position in the second block; and
determining a weight value corresponding to the pixel position according to the first pixel value, the first neighbouring pixel value, the second pixel value and the second neighbouring pixel value.

13. The method of claim 10, wherein determining the weight value according to the at least one first reference block comprises:
for a pixel position, adjusting a weight value corresponding to the pixel position by using a weight value corresponding to another pixel position.

14. The method of claim 10, wherein determining the prediction value of the current block based on the weight value, the at least one first reference block and the at least one second reference block comprises:
for a pixel position, determining a weight value corresponding to the pixel position, determining a third pixel value corresponding to the pixel position based on the first block, determining a fourth pixel value corresponding to the pixel position based on the second block, and determining at least one pixel value corresponding to the pixel position based on the at least one second reference block; and
determining a prediction pixel value corresponding to the pixel position, by weighted summing the at least one pixel value and at least one of the third pixel value or the fourth pixel value according to the weight value corresponding to the pixel position.

15. The method of claim 10, wherein determining the prediction value of the current block based on the weight value, the at least one first reference block and the at least one second reference block comprises:
- for a pixel position, determining a weight value corresponding to the pixel position, determining a third pixel value corresponding to the pixel position based on the first block, determining a fourth pixel value corresponding to the pixel position based on the second block, and determining a fifth pixel value corresponding to the pixel position based on one second reference block; and
- determining a prediction pixel value corresponding to the pixel position, by weighted summing the fifth pixel value and at least one of the third pixel value or the fourth pixel value according to the weight value corresponding to the pixel position.

16. The method of claim 10, wherein the at least one second reference block comprises a third block and a fourth block,
- wherein determining the prediction value of the current block based on the weight value, the at least one first reference block and the at least one second reference block comprises:
- for a pixel position, determining a weight value corresponding to the pixel position, determining a third pixel value corresponding to the pixel position based on the first block, determining a fourth pixel value corresponding to the pixel position based on the second block, determining a sixth pixel value corresponding to the pixel position based on the third block, and determining a seventh pixel value corresponding to the pixel position based on the fourth block; and
- determining a prediction pixel value corresponding to the pixel position, by weighted summing the sixth pixel value, the seventh pixel value and at least one of the third pixel value or the fourth pixel value according to the weight value corresponding to the pixel position.

17. The method of claim 10, wherein determining the at least one first reference block and the at least one second reference block for the current block comprises:
- determining at least one piece of first motion information and at least one piece of second motion information; and
- determining the at least one first reference block and the at least one second reference block based on the at least one piece of the first motion information and the at least one piece of the second motion information.

18. The method of claim 17, wherein determining the at least one piece of the first motion information and the at least one piece of the second motion information comprises:
- determining at least one piece of first initial motion information and at least one piece of second initial motion information; and
- refining the at least one piece of the first initial motion information and the at least one piece of the second initial motion information, respectively, to obtain the at least one piece of the first motion information and the at least one piece of the second motion information.

19. A decoder, comprising a first processor and a first memory storing instructions executable by the first processor, wherein the first processor is configured to:
- decode a bitstream; and
- determine an inter prediction mode parameter for a current block; determine, when the inter prediction mode parameter indicates that an Adaptive partitioning Mode (APM) is used for the current block to determine an inter prediction value of the current block, at least one first reference block and at least one second reference block for the current block, wherein the APM is used for partitioning of arbitrary shapes based on picture contents, wherein the partitioning is an actual partitioning or a simulated partitioning; and
- determine a prediction value of the current block according to the at least one first reference block and the at least one second reference block;
- wherein the first determining portion is further configured to determine an inter prediction mode parameter for a current block; determine, when the inter prediction mode parameter indicates that an APM is used for the current block to determine an inter prediction value of the current block, at least one first reference block and at least one second reference block for the current block; determine a weight value according to the at least one first reference block; and determine a prediction value of the current block based on the weight value, the at least one first reference block and the at least one second reference block,
- wherein the first processor determines the prediction value of the current block according to the at least one first reference block and the at least one second reference block by:
- determining a weight value according to the at least one first reference block; and
- determining the prediction value of the current block based on the weight value, the at least one first reference block and the at least one second reference block,
- wherein the at least one first reference block comprises a first block and a second block.

* * * * *